(12) United States Patent
Sugawara et al.

(10) Patent No.: US 8,477,644 B2
(45) Date of Patent: Jul. 2, 2013

(54) COMMUNICATION APPARATUS, COMMUNICATION METHOD

(75) Inventors: Yasuo Sugawara, Osaka (JP); Shohei Yamada, Osaka (JP); Waho Oh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 338 days.

(21) Appl. No.: 12/864,962

(22) PCT Filed: Jan. 22, 2009

(86) PCT No.: PCT/JP2009/050956
§ 371 (c)(1),
(2), (4) Date: Jul. 28, 2010

(87) PCT Pub. No.: WO2009/096305
PCT Pub. Date: Aug. 6, 2009

(65) Prior Publication Data
US 2010/0309836 A1    Dec. 9, 2010

(30) Foreign Application Priority Data

Jan. 29, 2008  (JP) ................................ 2008-017549

(51) Int. Cl.
*G01R 31/08* (2006.01)
(52) U.S. Cl.
USPC ............................ 370/252; 370/328; 455/446
(58) Field of Classification Search
USPC ......... 370/252–253, 328–338, 312, 447–448, 370/462; 455/446
See application file for complete search history.

(56) References Cited

U.S. PATENT DOCUMENTS 8,068,511 B2 * 11/2011 Reznik et al. ................. 370/447
8,139,524 B2 * 3/2012 Lee et al. ...................... 370/328
2004/0196803 A1 10/2004 Yi et al.

FOREIGN PATENT DOCUMENTS

JP       2006-515496 A       5/2006

OTHER PUBLICATIONS

"3GPP TS 36.300 V0.1.0 (Oct. 2006)", Technical Specification Group Radio Access Network, E-UTRA, E-UTRAN, Overall description, Stage 2, Release x.
"3GPP TS 36.300 V8.2.0 (Sep. 2007)",Technical Specification Group Radio Access Network, E-UTRA, E-UTRAN, Overall description, Stage 2, Release 8.

(Continued)

*Primary Examiner* — Ricky Ngo
*Assistant Examiner* — Iqbal Zaidi
(74) *Attorney, Agent, or Firm* — Birch, Stewart, Kolasch & Birch, LLP

(57) ABSTRACT

In an MBMS service desired to be received, if a condition for performing an MBMS request (an MBMS request trigger criterion) is satisfied (S3: YES), a mobile station 20a in an idle mode (RRC_IDLE) enters an MBMS request transmission process, transmits a preamble to a base station 10b, receives a random access response including scheduling information for transmitting a Message 3 and the like from the base station 10b, and transmits the Message 3 including an RRC Connection Request (including an NAS ID of the mobile station itself), the MBMS request and channel quality information to the base station 10b (S4), and if an Message 4, which includes RRC Connection Setup that is destined for the mobile station itself and includes the NAS ID, and which includes feedback resource assignment information, is received from the base station 10b (S5: YES), the mobile station 20a transits to a connected mode (RRC_CONNECTED), and also uses the designated resource to provide feedback to the base station (S6). Thereby, the MBMS service can be efficiently provided via SCPTM transmission.

3 Claims, 11 Drawing Sheets

OTHER PUBLICATIONS

"3GPP TS 36.304 V8.0.0 (Dec. 2007)", Technical Specification Group Radio Access Network, E-UTRA, User Equipment (UE) procedures in idle mode, Release 8.

ETRI, "Design of HARQ feedback channel for MBMS", 3GPP TSG RAN WG2 #56bis, Jan. 15-19, 2007, Sorrento, Italy, R2-070111.

Motorola, "Uplink Feedback for E-MBMS", 3GPP TSG RAN1 #49-bis, Jun. 25-29, 2007, Orlando, USA, R1-072710.

Motorola, "Uplink Feedback for E-MBMS", 3GPP TSG RAN2#57, Feb. 12-16, 2007, St. Louis, USA, R2-070726.

Panasonic, "Uplink feedback for eMBMS MBSFN operations", 3GPP TSG-RAN WG2 Meeting #58, May 7-11, 2007, Kobe, Japan, R2-071777.

"3GPP TS 36.300 V8.3.0 (Dec. 2007)", Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

CN Search Report issued in corresponding CN Application No. 200980111516.0 dated Aug. 31, 2012 is attached.

* cited by examiner

Configuration diagram of mobile station

COMMUNICATION APPARATUS, COMMUNICATION METHOD

TECHNICAL FIELD

The present invention relates to a communication technique, and more particularly, to a mobile station apparatus, a base station apparatus, a communication system, a communication method, and a program.

BACKGROUND ART

For a mobile telephone system network which is commonly applicable to fixed communication and mobile communication, in the 3GPP (3rd Generation Partnership Project), a W-CDMA (Wideband Code Division Multiple Access) scheme has been standardized as a 3rd Generation cellular mobile communication scheme, and the services have been sequentially started. Moreover, HSDPA (High Speed Downlink Packet Access) with further increased communication speed has also been standardized, and the services are being started. Furthermore, in the 3GPP, Evolved Universal Terrestrial Radio Access (hereinafter referred to as "EUTRA") has been studied.

As a downlink of the EUTRA, an OFDM (Orthogonal Frequency Division Multiplexing) scheme has been proposed. As an EUTRA technique, a technique such as an adaptive modulation and demodulation/error correction scheme (AMCS: Adaptive Modulation and Coding Scheme) based on adaptive radio link control (Link Adaptiveion) for channel coding and the like has been applied to the OFDM scheme. The AMCS scheme is a scheme for switching radio transmission parameters, such as an error correction scheme, an error correction coding rate, a data modulation multi-valued number (MCS: Modulation and Coding Scheme), a code Spreading Factor (SF) of time/frequency axes, and a multi-code multiplexing number, depending on a propagation path status at each mobile station, in order to efficiently perform high-speed packet data transmission. For example, for data modulation, a maximum throughput of a communication system can be increased by switching the modulation from QPSK (Quadrature Phase Shift Keying) modulation to more efficient multilevel modulation, such as 16QAM (Quadrature Amplitude Modulation) modulation or 64QAM modulation; as the propagation path status is improved. On the other hand, as an uplink of the EUTRA, a DFT-S-OFDM (Discrete Fourier transform Spread OFDM) scheme has been proposed (see the following Non-Patent Document 1).

FIG. 1 is a diagram showing a channel configuration in the EUTRA. The downlink of the EUTRA includes a Downlink Pilot Channel (DPiCH), a Physical Downlink Synchronization Channel (PSCH), a Physical Downlink Shared Channel (PDSCH), a Physical Downlink Control Channel (PDCCH), and a Physical Broadcast Channel (PBCH).

Moreover, the uplink of the EUTRA includes an Uplink Pilot Channel (UPiCH), a Random Access Channel (RACH), a Physical Uplink Shared Channel (PUSCH), and a Physical Uplink Control Channel (PUCCH) (for example, see the following Non-Patent Document 1).

Moreover, currently, in an argument related to the EUTRA, an MBMS (Multimedia Broadcast Multicast Service) service is studied. As a cell which provides the MBMS service, there are two cells including a cell (MBMS dedicated cell) which uses a frequency (a frequency dedicated to the MBMS service) which is different from a frequency used for unicast transmission and performs MBMS transmission in a dedicated manner, and a cell (MBMS/Unicast-mixed cell) which uses the frequency (a frequency which is not dedicated to the MBMS service) used for the unicast transmission and performs both the MBMS transmission and the unicast transmission. Any cell of them can be used to simultaneously provide the MBMS service to a plurality of users.

In addition, as an MBMS service transmission method, there are a method in which only one base station performs the transmission, and a method in which a plurality of base stations in time/frequency synchronization simultaneously perform the transmission. The former is referred to as "SCPTM (Single-Cell Point-to-Multipoint) transmission", and the latter is referred to as "MBSFN (Multimedia Broadcast multicast service Single Frequency Network) transmission". In the MBSFN transmission, the same MBMS transmission signals are simultaneously transmitted from the plurality of base stations, and the signals can be synthesized so that the signals can be seen as one MBMS transmission signal, in the mobile station. In this description, for convenience of explanation, a cell which performs the SCPTM transmission is referred to as "SCPTM cell".

FIG. 2 is a diagram showing a schematic configuration example of the MBMS service in the SCPTM transmission. The same AMCS as the unicast transmission is applied to the MBMS transmission signal in the SCPTM transmission. As shown in FIG. 2, in a cell 23 which provides the MBMS service via the SCPTM transmission, a state where a plurality of mobile stations 20c, 20d and the like are receiving the MBMS service will be considered. It is assumed that a base station 10c which provides the MBMS service via the SCPTM transmission, and the two mobile stations 20c and 20d are included, and the mobile stations 20c and 20d are receiving the MBMS service.

It is assumed that, when a mobile station in an idle mode, which hopes to receive the MBMS service via the SCPTM transmission, is designated by the base station 10c based on the current specification described in the following Non-Patent Document 1, the mobile station transits from the idle mode to a connected mode, and is assigned with an uplink feedback resource, and periodically provides feedback. The mobile station in the connected mode, which has been assigned with the feedback resource for the MBMS, uses the feedback resource designated by the base station, to provide the feedback to the base station. This feedback information includes a Channel Quality Indicator (CQI, also referred to as "downlink channel quality information" or "CQI feedback information") indicating downlink channel quality for each frequency domain, and ACK (Positive Acknowledgement)/NACK (Negative Acknowledgement) of HARQ (Hybrid Automatic Repeat Request) for data of the MBMS service. Particularly, if more detailed CQI feedback is further required, information indicating a frequency domain with good channel quality is fed back from the mobile station to the base station.

In FIG. 2, as shown by an arrow, for example, the mobile station 20c with poor downlink channel quality is providing the feedback. Based on the feedback information from the mobile station 20c, the base station 10c decides an MCS value (for example, 16QAM modulation, a ⅔ coding rate) which is a combination of the modulation multi-valued number and the coding rate in the AMCS, so that all the mobile stations 20c and 20d can receive the MBMS service, applies the MCS value to transmitted data of the MBMS service, and then performs the SCPTM transmission. It should be noted that the mobile station 20c which is providing the feedback is in the connected mode, and the mobile station 20d which is not providing the feedback is in the idle mode or the connected mode.

Non-Patent Document 1: 3GPP TS (Technical Specification) 36.300 V8.2.0 (2007-09), Evolved Universal Terrestrial Radio Access (E-UTRA) and Evolved Universal Terrestrial Radio Access Network (E-UTRAN); Overall description; Stage2 (Release 8).

Non-Patent Document 2: 3GPP TS (Technical Specification) 36.304 V8.0.0 (2007-12), Evolved Universal Terrestrial Radio Access (E-UTRA); User Equipment (UE) procedure in idle mode (Release 8).

DISCLOSURE OF THE INVENTION

Problems to be Solved by the Invention

Here, a case shown in FIG. 3 is considered. In FIG. 3, the base station 10c which is providing the MBMS service via the SCPTM transmission shown in FIG. 2, the mobile stations 20c and 20d which are receiving the MBMS service, and in addition, a mobile station 20e which has performed Cell Reselection into this cell 23 are shown. At this time, the mobile station 20e is in the idle mode.

In FIG. 2, it is assumed that the base station 10c assigns the feedback resource to the mobile station 20c with the poor downlink channel quality. In other words, the mobile station 20c is in the connected mode. Here, a downlink channel condition (or quality) of the mobile station 20d is assumed to be better than the downlink channel condition (or quality) of the mobile station 20c. At this time, while the base station 10c transmits the MBMS service with the MCS value in accordance with the poor downlink channel quality, the mobile station 20d with good downlink channel quality, which is not providing the feedback, can receive the MBMS service. Thus, in this case, there is no problem even if the base station 10c decides the MCS value without respect to the mobile station 20d which is not providing the feedback.

However, as shown in FIG. 3, if the downlink channel condition (or quality) is worse than the downlink channel condition (or quality) of the mobile station 20c which is providing the feedback, and the mobile station 20e in the idle mode selects the cell 23 and hopes to receive the MBMS service, since the uplink feedback resource has not been assigned, the MBMS service has not been provided with the MCS value which is optimal for this mobile station 20e. On the other hand, also in the base station 10c, existence of the mobile station 20e has not been noticed, and thus, the MCS value has been decided without respect to the mobile station 20e.

Moreover, in FIG. 2, there is a problem in that, in a case where the mobile station 20d receives the MBMS service in the idle mode, if the downlink channel condition (or quality) of the mobile station 20d is degraded and becomes worse than the channel condition (or quality) of the mobile station 20c, since the uplink feedback resource has not been assigned, the MBMS service is not provided with the MCS value which is optimal for this mobile station 20d. On the other hand, also in the base station 10c, a change in the downlink channel condition (or quality) of the mobile station 20d has not been noticed, and thus, the MCS value has been decided without respect to the mobile station 20d.

As above, if the base station 10c uses a conventional technique to assign an individual uplink feedback resource to each mobile station, the uplink feedback resource is increased. Moreover, there is a problem in that the base station 10c cannot efficiently select the mobile station depending on the downlink channel condition (or quality) of the mobile station.

Moreover, similarly, this status also similarly applies to the mobile station in the connected mode, which is receiving the MBMS service but is not transmitting uplink feedback information to the base station, in the cell which is providing the MBMS service via the SCPTM transmission. This status will be described with reference to FIG. 11.

In FIG. 11, the cell 23 in which a base station 10b provides the MBMS service via the SCPTM transmission, and mobile stations 20c and 20f are described. Here, the mobile station 20c represents the mobile station in the connected mode, which is receiving the MBMS service and transmitting the uplink feedback information with respect to the base station 10b, and the mobile station 20f represents the mobile station in the connected mode, which is receiving the MBMS service but is not transmitting the uplink feedback information to the base station 10b.

In other words, in FIG. 11, in a case where the mobile station 20f receives the MBMS service in the connected mode, if the downlink channel condition (or quality) of the mobile station 20f is degraded and becomes worse than the downlink channel condition (or quality) of the mobile station 20c, since the uplink feedback resource has not been assigned, the MBMS service has not been provided with the MCS value which is optimal for this mobile station 20f. On the other hand, also in the base station 10b, a change in the downlink channel condition (or quality) of the mobile station 20f has not been known, and thus, the MCS value has been decided without respect to the mobile station 20f.

As above, if the base station 10b uses a common technique to assign the individual uplink feedback resource to each mobile station, there is a problem of the increased uplink feedback resource. Moreover, there is a problem in that the base station 10b cannot efficiently select the mobile station depending on the downlink channel condition (or quality) of the mobile station.

An object of the present invention is to solve the above described problems, and the present invention provides a communication technique, particularly, a mobile station apparatus, a base station apparatus, a mobile communication system and a communication method, for efficiently providing the MBMS service to the mobile station via the SCPTM transmission.

Means for Solving the Problems

According to an aspect of the present invention, there is provided a mobile station apparatus which communicates with a base station apparatus which provides an MBMS service, wherein if a condition for performing an MBMS request is satisfied, the MBMS request is transmitted to the base station apparatus. Preferably, the MBMS request is an MBMS service feedback resource request. Preferably, the condition for performing the MBMS request is a case where a Physical Downlink Control Channel (PDCCH) to be used when the MBMS service is transmitted cannot be received, demodulated and/or decoded for a certain period of time. Moreover, the condition for performing the MBMS request may be a case where, while a Physical Downlink Control Channel (PDCCH) has been able to be received, demodulated and/or decoded, a Physical Downlink Shared Channel (PDSCH) has not been able to be received, demodulated and/or decoded for a certain period of Alternatively, the condition for performing the MBMS request may be a case where a downlink channel condition (or quality) of the mobile station apparatus itself is equal to or less than (or less than) a threshold broadcasted by the base station apparatus. The condition for performing the MBMS request may be a case where, while a Physical Downlink Control Channel (PDCCH) has been able to be received, demodulated and/or decoded, a transmission type (an MCS value and the like) for demodulating and/or decoding a Physical Downlink Shared Channel (PDSCH), which is designated in the Physical Downlink Control Channel (PDCCH), does not meet a downlink channel condition (or quality) of the mobile station apparatus itself. Preferably, contention based random access is performed in order to transmit the MBMS request.

Moreover, according to another aspect of the present invention, the mobile station apparatus may be a mobile station apparatus which communicates with a base station apparatus which provides an MBMS service, wherein if a condition for providing an MBMS Measurement Report is satisfied, the MBMS Measurement Report is transmitted to the base station apparatus. Preferably, the MBMS Measurement Report is an MBMS service feedback resource request report. Moreover, the condition for providing the MBMS Measurement Report may be a case where a Physical Downlink Control Channel (PDCCH) to be used when the MBMS service is transmitted cannot be received, demodulated and/or decoded for a certain period of time. Alternatively, the condition for providing the MBMS Measurement Report may be a case where, while a Physical Downlink Control Channel (PDCCH) has been able to be received, demodulated and/or decoded, a Physical Downlink Shared Channel (PDSCH) has not been able to be received, demodulated and/or decoded for a certain period of time. The condition for providing the MBMS Measurement Report may be a case where a downlink channel condition (or quality) of the mobile station apparatus itself is equal to or less than (or less than) a threshold broadcasted by the base station apparatus. The condition for providing the MBMS Measurement Report may be a case where, while a Physical Downlink Control Channel (PDCCH) has been able to be received, demodulated and/or decoded, a transmission type (an MCS value and the like) for demodulating and/or decoding a Physical Downlink Shared Channel (PDSCH), which is designated in the Physical Downlink Control Channel (PDCCH), does not meet a downlink channel condition (or quality) of the mobile station apparatus itself.

According to another aspect of the present invention, there is provided a base station apparatus which provides an MBMS service to a mobile station apparatus, wherein the mobile station apparatus is notified of an MBMS request trigger criterion and/or an MBMS Measurement Report trigger criterion. Preferably, if an MBMS service feedback request is received from the mobile station apparatus, a feedback resource is assigned to the mobile station apparatus. Preferably, if an MBMS service transmission request is received from the mobile station apparatus, an MBMS service designated in the MBMS service transmission request is provided.

According to another aspect of the present invention, there is provided a communication system including a mobile station apparatus and a base station apparatus which provides an MBMS service, wherein if a condition for performing an MBMS request is satisfied, the mobile station apparatus transmits the MBMS request to the base station apparatus; the base station apparatus assigns a feedback resource to the mobile station apparatus, based on the MBMS request received from the mobile station apparatus; the mobile station apparatus uses the feedback resource designated by the base station apparatus, to transmit feedback information to the base station apparatus; and the base station apparatus changes a transmission type for the MBMS service, based on the feedback information received from the mobile station apparatus.

Moreover, there is provided a communication system including a mobile station apparatus and a base station apparatus which provides an MBMS service, wherein if a condition for providing an MBMS Measurement Report is satisfied, the mobile station apparatus transmits the MBMS Measurement Report to the base station apparatus; and the base station apparatus changes a transmission type for the MBMS service, based on the MBMS Measurement Report received from the mobile station apparatus.

ADVANTAGE OF THE INVENTION

According to the present invention, there is an advantage that the MBMS service can be efficiently provided to the mobile station via the SCPTM transmission.

Figure 1:
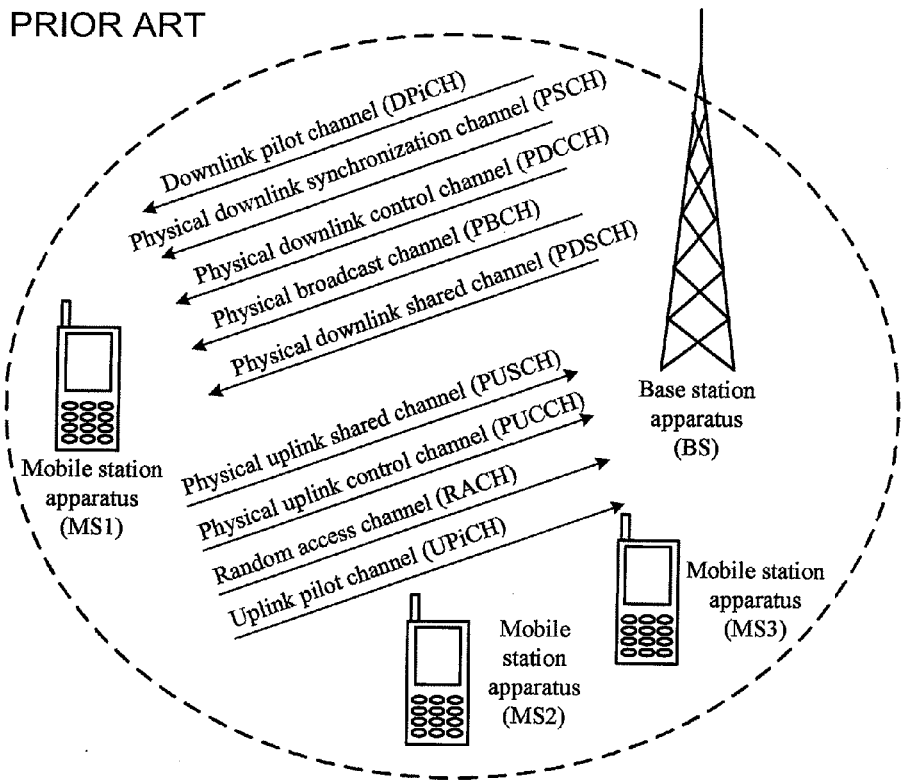
FIG. 1 is a diagram showing a channel configuration in EUTRA.
Figure 2:
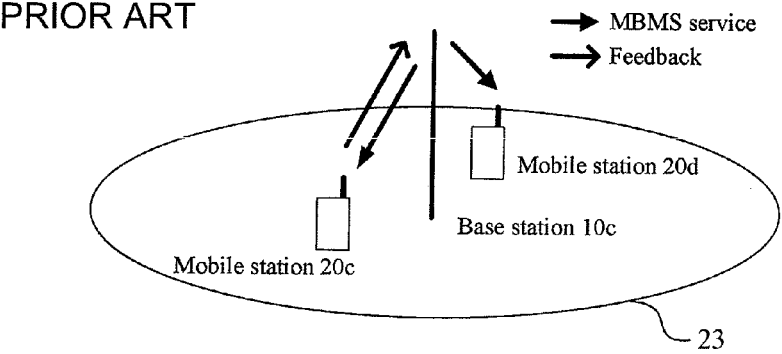
FIG. 2 is a diagram showing a schematic configuration example of an MBMS service.
Figure 3:
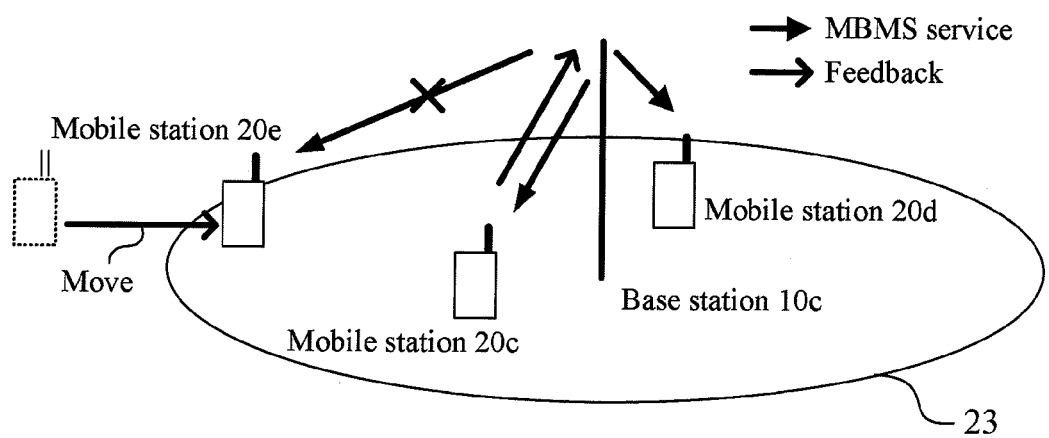
FIG. 3 is a diagram in which a base station which is providing the MBMS service via SCPTM transmission shown in FIG. 2, mobile stations which are receiving the MBMS service, and in addition, a mobile station which has performed Cell Reselection into this cell are shown.

DESCRIPTION OF SYMBOLS 100 base station apparatus
101 data control unit
102 OFDM modulation unit
103 radio unit
104 scheduling unit
105 channel estimation unit
106 DFT-S-OFDM demodulation unit
107 data extraction unit
109 upper layer
109a radio resource control unit
200 mobile station apparatus
201 data control unit
202 DFT-S-OFDM modulation unit
203 radio unit
204 scheduling unit
205 channel estimation unit
206 OFDM demodulation unit
207 data extraction unit
208 MBMS request unit
209 upper layer
209a radio resource control unit

BEST MODE FOR CARRYING OUT THE INVENTION

First Embodiment

Hereinafter, a communication technique according to a first embodiment of the present invention will be described with reference to the drawings.

The communication technique according to the present embodiment is configured to include a base station apparatus (hereinafter referred to as "base station") 100, and a mobile station apparatus (hereinafter referred to as "mobile station") 200.

Figure 4:
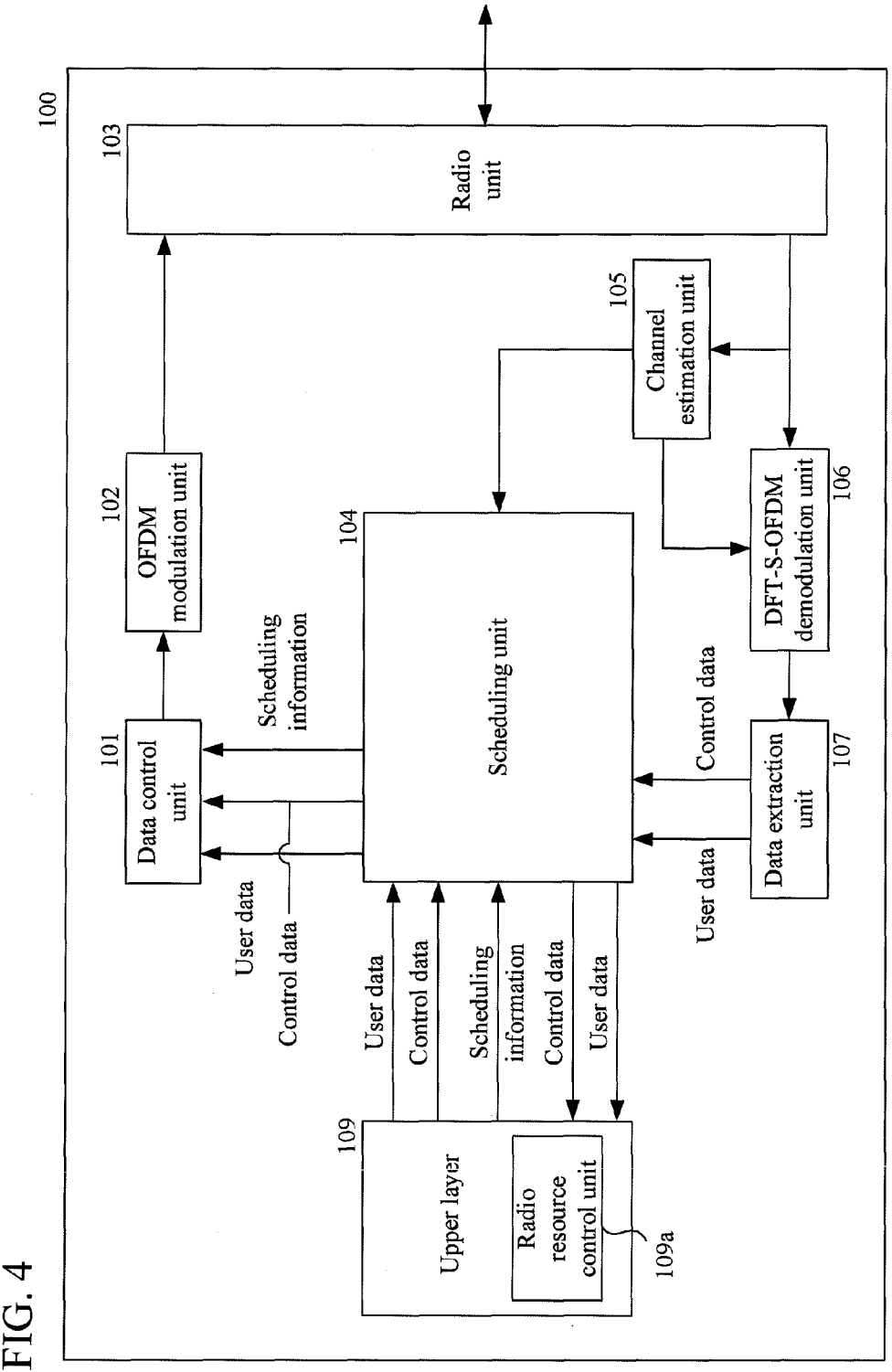
FIG. 4 is a functional block diagram showing a configuration example of a base station apparatus used for a communication technique according to the present embodiment.

FIG. 4 is a functional block diagram showing a configuration example of the base station apparatus used for the communication technique according to the present embodiment. Since the configuration example of the base station apparatus shown in FIG. 4 is applicable not only to the first embodiment, but also to a second embodiment to be described later, this is referred to. As shown in FIG. 4, the base station apparatus 100 is configured to include a data control unit 101, an OFDM modulation unit 102, a radio unit 103, a scheduling unit 104, a channel estimation unit 105, a DFT-Spread-OFDM demodulation unit (DFT-S-OFDM demodulation unit) 106, a data extraction unit 107, and a upper layer 109.

The data control unit 101 receives inputs of control data, user data and an MBMS service (also referred to as "MBMS transmission data") from the scheduling unit 104, and also, based on scheduling information inputted from the scheduling unit 104, maps the control data to a Downlink Pilot Channel (DPiCH), a Physical Downlink Synchronization Channel (PSCH), a Physical Downlink Shared Channel (PDSCH), a Physical Downlink Control Channel (PDCCH), and a Physical Broadcast Channel (PBCH). Moreover, the user data for each mobile station is mapped to the Physical Downlink Shared Channel (PDSCH). Each mapped data is outputted to the OFDM modulation unit 102.

It should be noted that an RRC (Radio Resource Control) message and an MAC (Medium Access Control) control Element are mapped to the Physical Downlink Shared Channel (PDSCH), and transmitted to the mobile station.

Moreover, when the MBMS service is transmitted via SCPTM transmission, the MBMS transmission data is mapped to the Physical Downlink Shared Channel (PDSCH), and a group identifier MBMS-RNTI (MBMS-Radio Network Temporary Identity) is mapped to the Physical Downlink Control Channel (PDCCH).

Moreover, MBMS-related information is included in a BCCH (Broadcast Control Channel) or an MCCH (Multicast Control Channel), which is a logical channel, and is mapped to the Physical Downlink Shared Channel (PDSCH).

Moreover, a Reference Signal (RS) is mapped to the Downlink Pilot Channel (DPiCH).

Based on the scheduling information from the scheduling unit 104 (including downlink resource block PRB (Physical Resource Block) assignment information (for example, resource block position information such as a frequency and a time), and an MCS value (for example, 16QAM modulation, a ⅔ coding rate) corresponding to each PRB, and the like), the OFDM modulation unit 102 performs OFDM signal processes, such as coding, data modulation, serial/parallel conversion of an input signal, an IFFT (Inverse Fast Fourier Transform) process, CP (Cyclic Prefix) insertion, as well as filtering, for the user data and the MBMS transmission data inputted from the data control unit 101, and generates and outputs an OFDM signal to the radio unit 103.

The radio unit 103 up-converts modulated data which has been inputted from the OFDM modulation unit 102, into a radio frequency to generate a radio signal, and transmits the radio signal via an antenna (not shown) to the mobile station 200.

Moreover, the radio unit 103 receives an uplink radio signal from the mobile station 200 via the antenna (not shown), down-converts the uplink radio signal into a baseband signal, and outputs received data to the channel estimation unit 105 and the DFT-S-OFDM demodulation unit 106.

The scheduling unit 104 performs downlink scheduling and uplink scheduling. In the downlink scheduling, based on uplink feedback information (downlink channel quality information (CQI feedback information), ACK/NACK feedback information for the user data or the MBMS transmission data of a downlink, and the like) received from the mobile station apparatus 200, information on an available PRB in each mobile station apparatus, a buffer status, scheduling information inputted from the upper layer 109, and the like, a scheduling process for mapping the control data, the user data and the MBMS transmission data of the downlink, which have been inputted from the upper layer 109, to each channel, and a calculation process for a downlink transmission type (the MCS value and the like) for modulating each data are performed. These pieces of the scheduling information are outputted to the data control unit 101.

Moreover, in the uplink scheduling, based on a result of estimating an uplink channel condition (a radio propagation path state), which is outputted from the channel estimation unit 105, a resource assignment request (including an MBMS request) from the mobile station apparatus 200, the information on the available PRB in each mobile station apparatus 200, the scheduling information inputted from the upper layer 109, and the like, a scheduling process for mapping the user data and the control data of an uplink to each channel, and a calculation process for an uplink transmission type (the MCS value and the like) for modulating each data are performed.

These pieces of the uplink scheduling information are outputted to the data control unit 101.

Moreover, the scheduling unit 104 outputs the control data, the user data and the MBMS transmission data of the downlink, which have been inputted from the upper layer 109, to the data control unit 101. Moreover, for the control data and the user data of the uplink, which have been inputted from the data extraction unit 107, the scheduling unit 104 outputs the user data to the upper layer 109, and processes the control data if necessary and then outputs the control data to the upper layer 109.

The scheduling unit 104 generates an MAC control Element, and exchanges the MAC control Element with the mobile station apparatus 200.

In order to demodulate the uplink data, the channel estimation unit 105 estimates the uplink channel condition from a Demodulation Reference Signal (DRS) of an Uplink Pilot Channel (UPiCH), and outputs the estimation result to the DFT-S-OFDM demodulation unit 106. Moreover, in order to perform the uplink scheduling, the uplink channel condition is estimated from a Sounding Reference Signal (SRS) of the Uplink Pilot Channel (UPiCH), and outputs the estimation result to the scheduling unit 104. It should be noted that while an uplink communication scheme is assumed to be a single carrier scheme such as DFT-S-OFDM or the like, a multicarrier scheme such as an OFDM scheme may be used.

Based on the result of estimating the uplink channel condition, which has been inputted from the channel estimation unit 105, the DFT-S-OFDM demodulation unit 106 performs DFT-S-OFDM signal processes, such as DFT transform, subcarrier mapping, the IFFT transform and the filtering, for the modulated data inputted from the radio unit 103, thereby applies a demodulation process, and provides an output to the data extraction unit 107.

The data extraction unit 107 confirms whether the data inputted from the DFT-S-OFDM demodulation unit 106 is true or false, and also outputs an acknowledgement result (ACK/NACK) to the scheduling unit 104. Moreover, the data extraction unit 107 divides the data inputted from the DFT-S-OFDM demodulation unit 106 into the user data and the control data, and outputs the user data and the control data to the scheduling unit 104. The divided control data includes the uplink feedback information (the downlink channel quality information, and the ACK/NACK feedback information for the user data or the MBMS transmission data of the downlink) notified by the mobile station 200.

The upper layer 109 processes the user data and the control data. The upper layer 109 has a radio resource control unit 109*a*. The radio resource control unit 109*a* generates the RRC message, and exchanges the RRC message with a radio resource control unit 209*a* of the mobile station apparatus 200. Moreover, the radio resource control unit 109*a* also performs state management for the mobile station apparatus 200. Moreover, if the upper layer 109 receives the MBMS request from the mobile station, the upper layer 109 generates feedback resource assignment information for the mobile station 200, based on the downlink channel quality information included in the MBMS request. Moreover, the radio resource control unit 109*a* generates Measurement Configuration information, and notifies the mobile station apparatus of the Measurement Configuration information.

Figure 10:
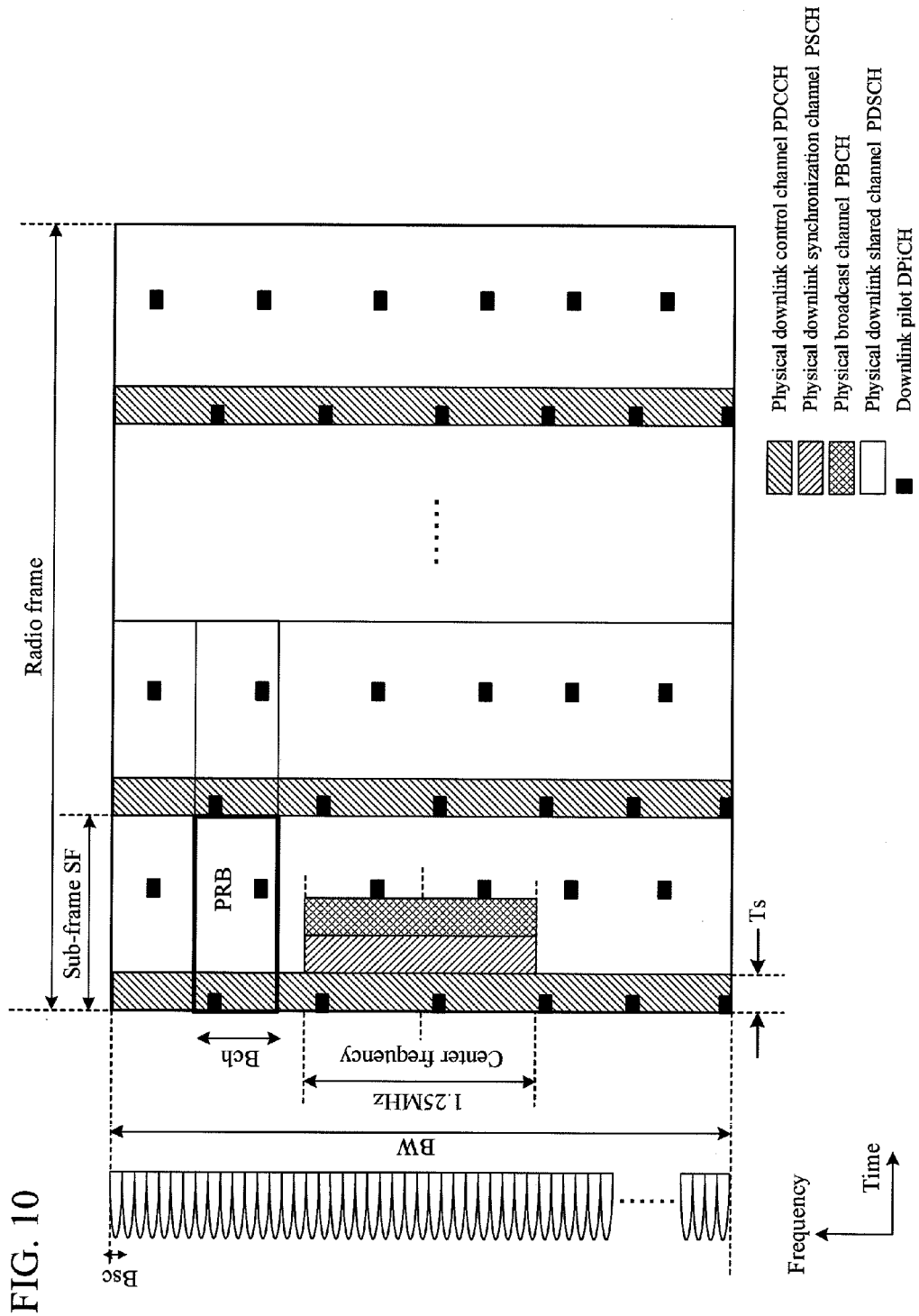
FIG. 10 is a diagram for explaining a configuration of a radio frame (10 milliseconds) in a downlink, and an example of mapping radio channels.

FIG. 10 is a diagram for explaining a configuration of one radio frame (10 milliseconds) in the downlink, and an example of mapping The downlink radio frame includes a plurality of two-dimensional PRBs in Sub-frames (SFs) of a frequency bandwidth (Bch) and a time axis.

For example, the frequency bandwidth (Bch) of the PRB is 180 kHz, a subcarrier frequency bandwidth (Bsc) is 15 kHz, one radio frame is 10 milliseconds, the Sub-frame (SF) is one millisecond, and the entire downlink radio frame includes 10 PRBs in a time direction and 110 PRBs in a frequency direction. Moreover, since one PRB includes 12 subcarriers, the entire system includes 1320 subcarriers. Ts represents an OFDM symbol length.

As shown in FIG. 10, the Downlink Pilot Channel (DPiCH, including the RS) is mapped to the beginning of each Sub-frame (SF). Moreover, for the Physical Broadcast Channel (PBCH) and the Physical Downlink Synchronization Channel (PSCH), one of them is mapped to the beginning of each radio frame, and/or, a plurality of them are mapped in the radio frame. A part of the rest of each PRB is used as the Physical Downlink Shared Channel (PDSCH), and is allocated to each mobile station by using an AMCS.

Figure 5:
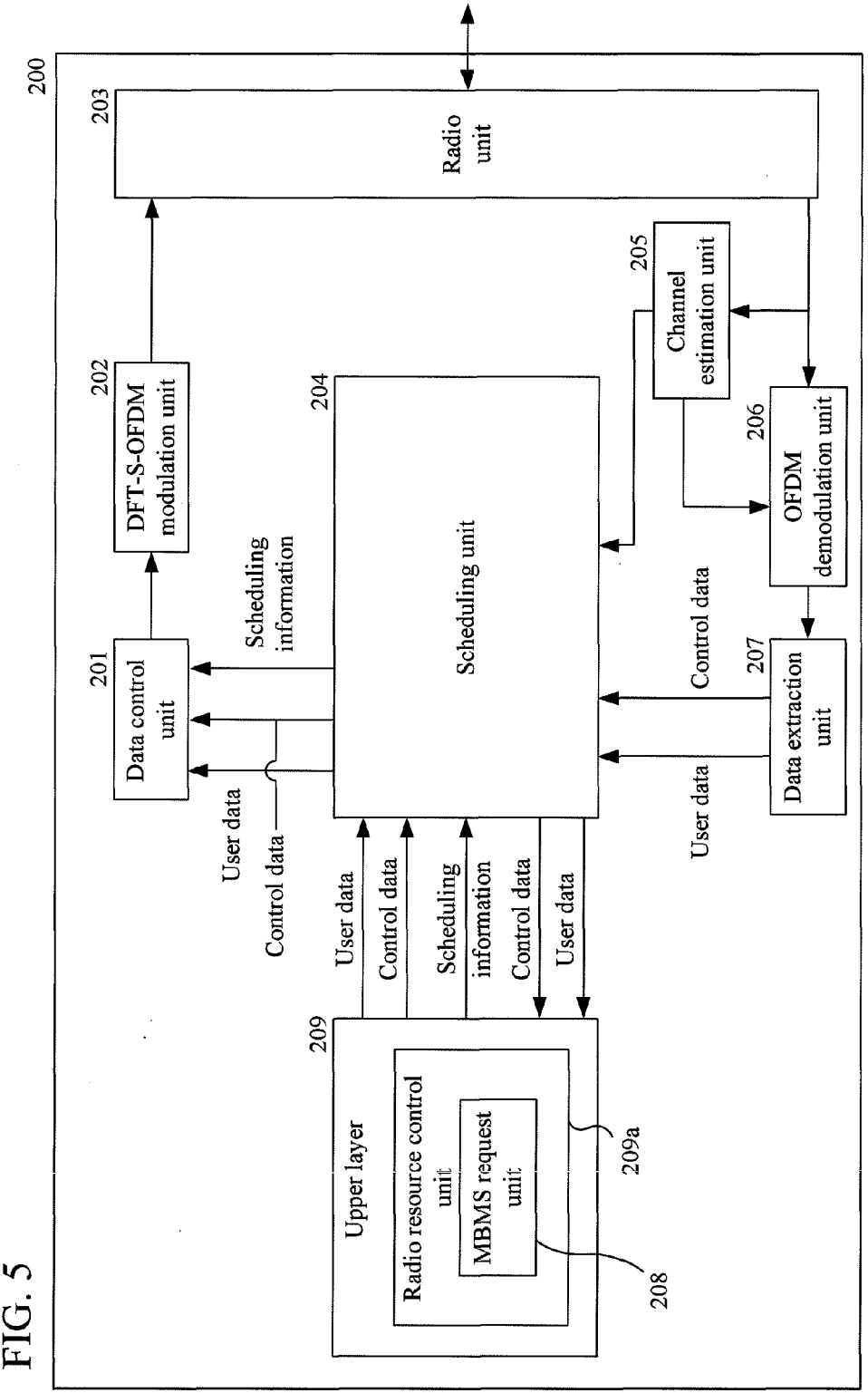
FIG. 5 is a functional block diagram showing a configuration example of a mobile station apparatus in the present embodiment.

FIG. 5 is a functional block diagram showing a configuration example of the mobile station apparatus in the present embodiment. The mobile station apparatus configuration described in FIG. 5 is similarly applied not only to the first embodiment, but also to the second embodiment. As shown in FIG. 5, the mobile station apparatus 200 is configured to include a data control unit 201, a DFT-S-OFDM modulation unit 202, a radio unit 203, a scheduling unit 204, a channel estimation unit 205, an OFDM demodulation unit 206, a data extraction unit 207, and a upper layer 209.

The data control unit 201 receives inputs of the control data and the user data from the scheduling unit 204, and also, based on scheduling information inputted from the scheduling unit 204, maps the data to a Physical Uplink Shared Channel (PUSCH) and a Physical Uplink Control Channel (PUCCH). Moreover, the Demodulation Reference Signal (DRS) and the Sounding Reference Signal (SRS) are mapped to the Uplink Pilot Channel (UPiCH). Moreover, when a preamble is transmitted in random access (contention based random access and non-contention random access), the preamble is mapped to a Random Access Channel (RACH).

If the Physical Uplink Shared Channel (PUSCH) has been assigned to the mobile station apparatus by the base station apparatus, the feedback information (the CQI feedback information and/or the ACK/NACK feedback information) is mapped to the Physical Uplink Shared Channel (PUSCH). On the other hand, if the Physical Uplink Shared Channel (PUSCH) has not been assigned, the feedback information (the CQI feedback information and/or the ACK/NACK feedback information) is mapped to the Physical Uplink Control Channel (PUCCH).

Each data mapped in this way is outputted to the DFT-S-OFDM modulation unit 202.

Figure 6:
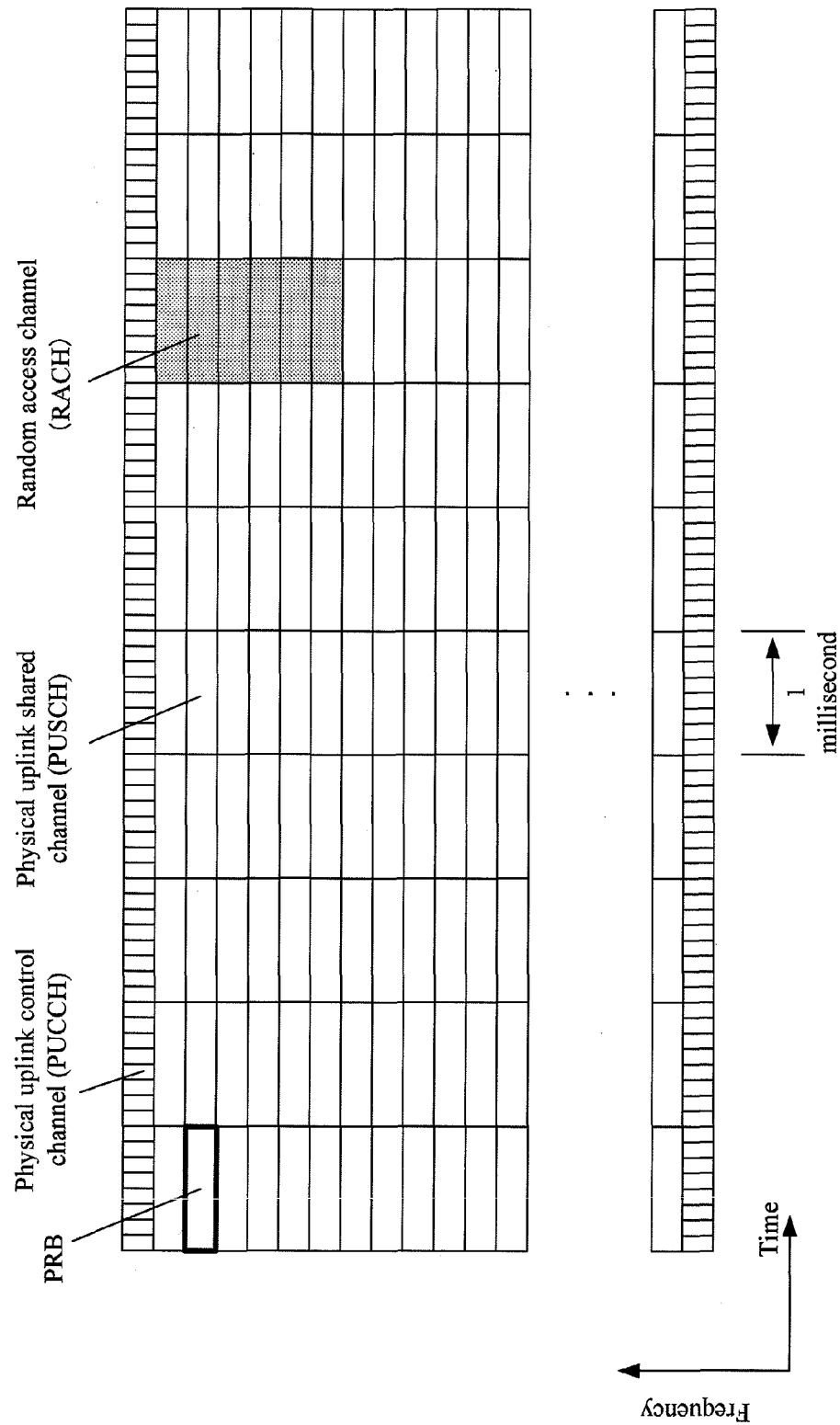
FIG. 6 is a diagram showing an example of mapping a Physical Uplink Shared Channel (PUSCH), a Physical Uplink Control Channel (PUCCH), and a Random Access Channel (RACH). A vertical axis denotes a frequency, and a horizontal axis denotes a time.

FIG. 6 shows a configuration example of one radio frame (10 milliseconds) in the uplink, and this uplink radio frame is divided into a plurality of radio resource blocks PRBs. A vertical axis indicates the frequency, and a horizontal axis indicates the time. One PRB radio resource is configured in units of regions of 180 kHz in the frequency direction and one millisecond in the time direction, and the Physical Uplink Shared Channel (PUSCH), the Physical Uplink Control Channel (PUCCH), and the Random Access Channel (RACH) are mapped. Moreover, although the Uplink Pilot Channel (UPiCH, including the DRS and the SRS) is not shown, the Uplink Pilot Channel (UPiCH, including the DRS and the SRS) is distributed and mapped in units of symbols, and in units of subcarriers, within the region of the Physical Uplink Shared Channel (PUSCH) or the Physical Uplink Control Channel (PUCCH).

The DFT-S-OFDM modulation unit 202 performs the DFT-S-OFDM signal processes, such as the data modulation, a DFT (Discrete Fourier Transform) process, the subcarrier mapping, the IFFT (Inverse Fast Fourier Transform) process, the CP insertion and the filtering, for the data inputted from the data control unit 201, and generates and outputs a DFT-S-OFDM signal to the radio unit 203.

It should be noted that while the uplink communication scheme is assumed to be the single carrier scheme such as the DFT-S-OFDM or the like, the multicarrier scheme such as the OFDM scheme may be used instead thereof.

The radio unit 203 up-converts modulated data which has been inputted from the DFT-S-OFDM modulation unit 202, into a radio frequency to generate a radio signal, and transmits the radio signal via an antenna (not shown) to the base station 100.

Moreover, the radio unit 203 receives the radio signal modulated with the downlink data, from the base station 100, via the antenna (not shown), down-converts the radio signal into a baseband signal, and outputs received data to the channel estimation unit 205 and the OFDM demodulation unit 206.

Based on a result of estimating a downlink channel condition (the radio propagation path state), which has been inputted from the channel estimation unit 205, the uplink scheduling information from the base station 100, which has been inputted from the data extraction unit 207, and scheduling information inputted from the upper layer 209, the scheduling unit 204 performs a scheduling process for mapping the user data and the control data of the uplink, which have been inputted from the upper layer 209, to each channel. It should be noted that, for an MCS for the uplink, the MCS value notified by the base station 100 is used. These pieces of the scheduling information are outputted to the data control unit 201. The scheduling unit 204 generates the MAC control Element, and exchanges the MAC control Element with the base station apparatus 100.

Moreover, the scheduling unit 204 outputs the control data and the user data of the uplink, which have been inputted from the upper layer 209, to the data control unit 201. Moreover, an MBMS request inputted from an MBMS request unit 208 is outputted to the data extraction unit 201. Moreover, the scheduling unit 204 also outputs the downlink channel quality information (the CQI feedback information) inputted from the channel estimation unit 205, and the ACK/NACK feedback information inputted from the data extraction unit 207, to the data control unit 201. Moreover, for the control data and the user data of the downlink, which have been inputted from the data extraction unit 207, the scheduling unit 204 outputs the user data to the upper layer 209, and processes the control data if necessary and then outputs the control data to the upper layer 209.

In order to demodulate the downlink data, the channel estimation unit 205 estimates the downlink channel condition from the Reference Signal (RS) of the Downlink Pilot Channel (DPiCH), and outputs the estimation result to the OFDM demodulation unit 206. Moreover, in order to notify the base station 100 of the result of estimating the downlink channel condition, the channel estimation unit 205 converts this estimation result into the downlink channel quality information (the CQI feedback information) and outputs the downlink channel quality information (the CQI feedback information) to the scheduling unit 204.

Based on the result of estimating the downlink channel condition, which has been inputted from the channel estimation unit 205, the OFDM demodulation unit 206 performs an OFDM demodulation process for the modulated data inputted from the radio unit 203, and provides an output to the data extraction unit 207.

The data extraction unit 207 confirms whether the data inputted from the OFDM demodulation unit 206 is true or false, and also outputs the acknowledgement result (the ACK/NACK feedback information) to the scheduling unit 204. Moreover, the data extraction unit 207 divides the data inputted from the OFDM demodulation unit 206 into the user data and the control data, and outputs the user data and the control data to the scheduling unit 204.

The upper layer 209 processes the user data and the control data. The upper layer 209 has the radio resource control unit 209a. The radio resource control unit 209a generates the RRC message, and exchanges the RRC message with the radio resource control unit 109a of the base station apparatus 100. The radio resource control unit 209a retains the RRC message from the base station apparatus 100, and sets parameters to related functional units. Moreover, the radio resource control unit 209a also performs the state management for the mobile station itself.

Moreover, the radio resource control unit 209a has the MBMS request unit 208, and based on the data inputted from the scheduling unit 204, if the transmission of the MBMS service is not performed, the MBMS request including an MBMS service transmission request is generated and outputted to the scheduling unit 204. Moreover, if a transmission type (the MCS value and the like) for the MBMS service which is being transmitted is changed, or an uplink feedback resource is requested, the MBMS request including an MBMS service feedback request is generated and outputted to the scheduling unit 204.

Moreover, the radio resource control unit 209a sets the Measurement Configuration information received from the base station apparatus, and performs measurement of a measurement item designated by the base station, and if a condition for providing an MBMS Measurement Report is satisfied, the radio resource control unit 209a transmits the MBMS Measurement Report to the base station.

Figure 7:
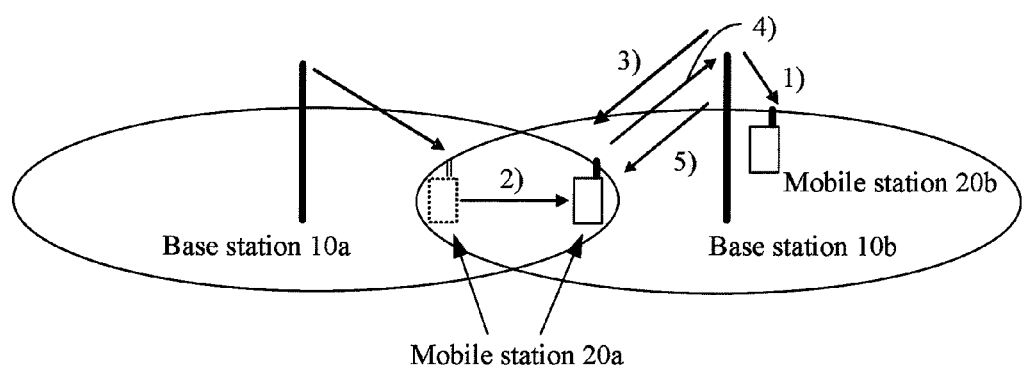
FIG. 7 is a diagram showing a configuration example of a communication system using the communication technique according to the present embodiment.
Figure 8:
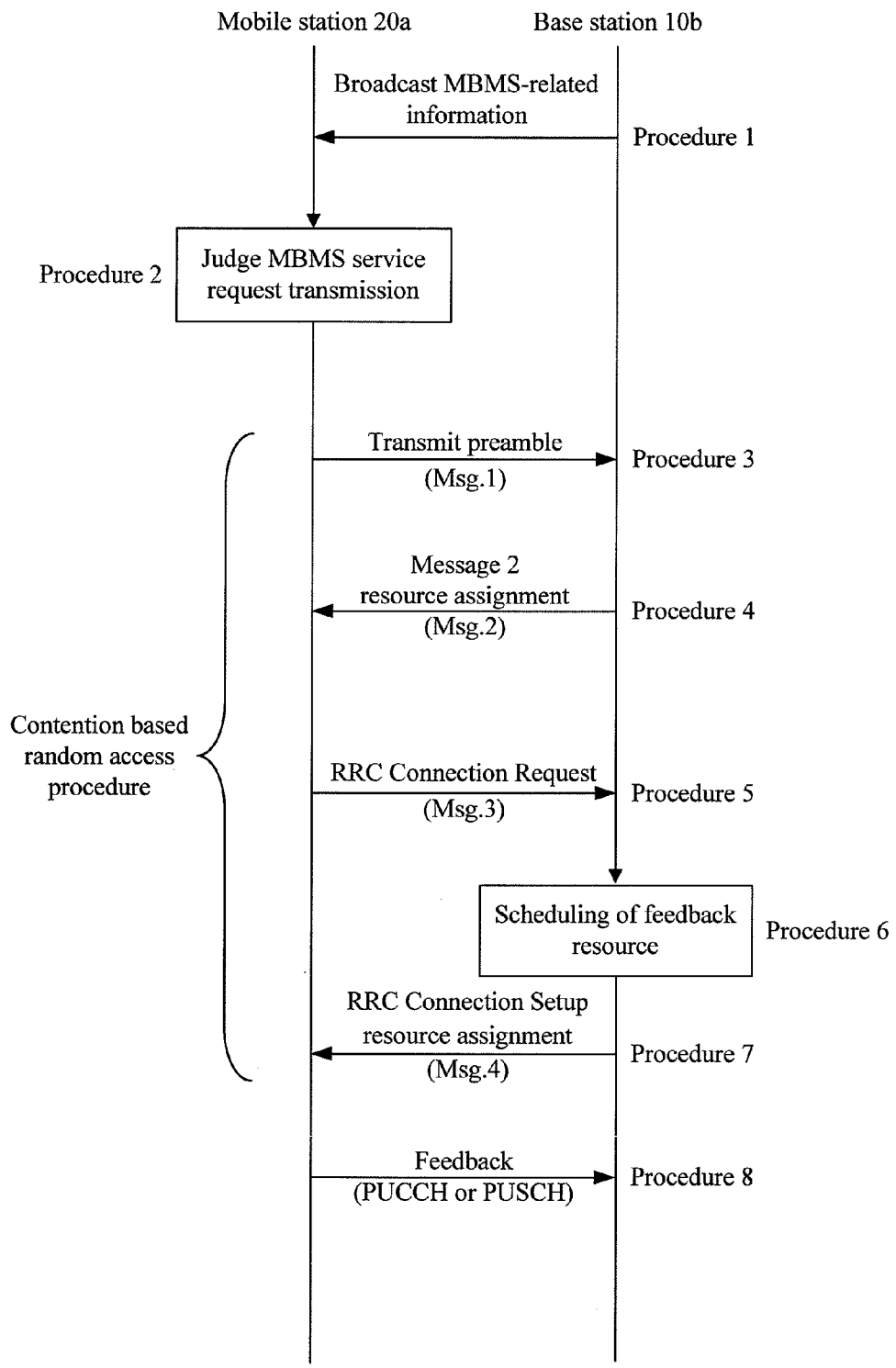
FIG. 8 is a sequence diagram showing a procedure in which the mobile station knows that the provision of the MBMS service via the SCPTM transmission is being performed in the base station, requests a feedback resource from the base station, and uses the feedback resource designated by a base station 10*b* to provide feedback.
Figure 9:
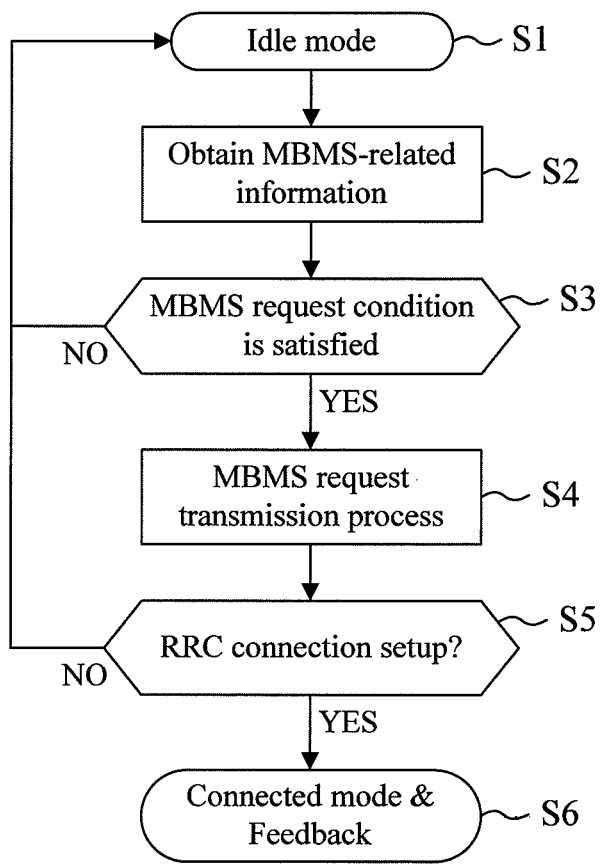
FIG. 9 is a diagram showing a flowchart of state transition from an idle mode to connected mode, through the procedure of FIG. 8.

FIGS. 7, 8 and 9 are diagrams for explaining a mechanism of the communication technique according to the present embodiment. FIG. 7 is a conceptual diagram showing a mobile station 20b which is receiving the MBMS service in a cell in which a base station 10b provides the MBMS service via the SCPTM transmission (Procedure 1)), and procedures (Procedures 3), 4) and 5)) in which a mobile station 20a uses a normal Cell Reselection approach described in the above described Non-Patent Document 2 to move to this (Cell Reselection) (Procedure 2)), and subsequently receives the MBMS service from the base station 10b. It should be noted that the base station 10b may be a cell which supports both MBSFN transmission and the SCPTM transmission.

FIG. 8 is a sequence diagram showing a procedure in which the mobile station 20a knows that the provision of the MBMS service via the SCPTM transmission is being performed in the base station 10b, requests a feedback resource to the base station 10b, and uses the feedback resource designated by the base station 10b, to transmit the uplink feedback information. FIG. 9 is a diagram showing a flowchart of state transition of the mobile station 20a from an idle mode to a connected mode, through the procedure of FIG. 8.

Hereinafter, a flow when the mobile station in the idle mode transmits the uplink feedback information will be described by using the sequence diagram of FIG. 8.

As shown in FIG. 7, in an initial state, the mobile station 20b represents the mobile station which is transmitting the uplink feedback information, in the mobile stations which are receiving the MBMS service via the SCPTM transmission from the base station 10b. In other words, the mobile station 20b is in the connected mode. Moreover, a base station 10a and the base station 10b are the base stations of source and destination of the move, respectively, when the mobile station 20a performs the Cell Reselection.

As a result of the Cell Reselection (Procedure 2) of FIG. 7), the mobile station 20a in the idle mode receives, demodulates and/or decodes the Physical Downlink Synchronization Channel (PSCH) and the Physical Broadcast Channel (PBCH) for the base station 10b. Moreover, the mobile station 20a knows that the provision of the MBMS service via the SCPTM transmission is being performed in the base station 10b. This knowledge is obtained from the MBMS-related information broadcasted by the base station 10b (Procedure 1 of FIG. 8, FIG. 7—Procedure 3)). The MBMS-related information is included in the BCCH (Broadcast Control Channel) or the MCCH (Multicast Control Channel), which is the logical channel, and is mapped to the Physical Downlink Shared Channel (PDSCH). It should be noted that the MBMS-related information includes advertising information indicating that the provision of the MBMS service via the SCPTM transmission is being performed in the base station 10b, and in addition, an MBMS request trigger criterion (to be described later) and the like.

It should be noted that this knowledge may be obtained through the advertising information broadcasted by an adjacent base station (in this case, the base station 10a), at a stage before the mobile station 20a moves to this cell.

Next, the mobile station 20a confirms whether or not the transmission of the MBMS service is actually being performed in this cell, and judges whether or not to perform the MBMS request (FIG. 8—Procedure 2). This judgment is performed by the MBMS request unit 208. This MBMS request signaling is transmitted by using the contention based random access.

There are two kinds of MBMS requests. One is "MBMS service transmission request" which is transmitted if the transmission of the MBMS service desired to be received is not being performed. The other one is "MBMS service feedback request" which is transmitted if the transmission type (the MCS value and the like) for the MBMS service which is being transmitted is changed, or the uplink feedback resource is requested.

In other words, if the transmission of the MBMS service desired to be received is not being performed, in order to transmit the MBMS request (an MBMS service transmission request message), the mobile station 20a transmits a Message 1 (Msg. 1) to be described later, to the base station 10b (FIG. 8—Procedure 3). Moreover, if, while the transmission of the MBMS service desired to be received is being performed, the following condition (an MBMS request transmission condition) is satisfied, in order to transmit the MRMS request MBMS service feedback request message), the Message 1 to be described later is transmitted to the base station 10b (FIG. 8—Procedure 3).

Condition 1) a case where the Physical Downlink Control Channel (PDCCH) to be used when the MBMS service is transmitted cannot be received, demodulated and/or decoded for a certain period of time. In other words, a case where the group identifier MBMS-RNTI to be used when the MBMS service is transmitted cannot be detected for a certain period of time.

Condition 2) a case where, while the Physical Downlink Control Channel (PDCCH) has been able to be received, demodulated and/or decoded, the Physical Downlink Shared Channel (PDSCH) has not been able to be received, demodulated and/or decoded for a certain period of time. In other words, a case where Cyclic Redundancy Check (CRC) added to the Physical Downlink Shared Channel (PDSCH) has not succeeded for a certain period of time.

Condition 3) a case where the downlink channel condition (or quality) of the mobile station itself is equal to or less than (or less than) a threshold broadcasted by the base station 10b.

Condition 4) a case where, while the Physical Downlink Control Channel (PDCCH) has been able to be received, demodulated and/or decoded, the transmission type (the MCS value and the like) for demodulating and/or decoding the Physical Downlink Shared Channel (PDSCH), which is designated in the Physical Downlink Control Channel (PDCCH), does not meet the downlink channel condition (or quality) of the mobile station itself. In other words, a case where the MCS value is too high for the downlink channel condition (or quality) of the mobile station itself (the MCS value corresponding to a channel condition better than the downlink channel condition of the mobile station itself), and thus the Physical Downlink Shared Channel (PDSCH) including the MBMS service cannot be Provided, demodulated and/or decoded.

The above described Condition 3) will be described below in further detail. The mobile station 20a measures the Physical Downlink Synchronization Channel (PSCH) and the Downlink Pilot Channel (DPiCH) for the base station 10b, through the cell selection/reselection (Procedure 2) of FIG. 7). In other words, a) a correlation value of a synchronization code included in the Physical Downlink Synchronization Channel (PSCH) corresponding to the base station 10b, and a correlation value of a Reference Signal (RS) code included in the Downlink Pilot Channel (DPiCH) corresponding to the base station 10b (for example, a dB value, an mV value).

b) a received power value of the Physical Downlink Synchronization Channel (PSCH), and a received power value of the Downlink Pilot Channel (DPiCH) (RSRP: Reference Signal Received Power), which have been calculated from the correlation values (for example, a dBm value, an mW value).

c) a radio propagation loss value between the mobile station and the base station, which is calculated from transmitted power of the Physical Downlink Synchronization Channel (PSCH) and the Downlink Pilot Channel (DPiCH), which has been broadcasted by the Physical Broadcast Channel (PBCH), and the received power values of the Physical Downlink Synchronization Channel (PSCH) and the Downlink Pilot Channel (DPiCH) (for example, path loss, the dB value)

d) an EUTRA carrier Received Signal Strength Indicator (RSSI, for example, the dBm value, the mW value) detected from a downlink OFDM signal and the like.

The mobile station 20a uses one or more of these measurement results to perform comparison with the threshold broadcasted by the base station 10b, and judges the downlink channel condition (or quality) Then, if the measurement result is equal to or less than (or less than) a predetermined threshold, the mobile station 20a transmits the Message 1 to be described later, to the base station 10b, in order to transmit the MBMS request (the MBMS service feedback request message).

It should be noted that the above described conditions are not limited thereto. Moreover, operations may be performed not only if a single condition is satisfied, but also if a plurality of conditions are satisfied. Condition 1, Condition 2 and Condition 4 are thresholds related to an MBMS reception status, and Condition 3 is a threshold related to the channel condition. As above, the mobile station, which has detected that any condition of the above described Conditions 1) to 4) has been satisfied, immediately transmits the MBMS request (the MBMS service feedback request) via a contention based random access procedure. Moreover, the mobile station, which has detected that the transmission of the MBMS service desired to be received is not being performed, also similarly, immediately transmits the MBMS request (the MBMS service transmission request message) via the contention based random access procedure.

Furthermore, since the base station 10*b* broadcasts information (the MBMS request trigger criterion: MBMS Trigger Criteria) for controlling a frequency of occurrence of the MBMS request, as described below, the mobile station can control the frequency of occurrence of the MBMS request.

Criterion 1) prohibition of the MBMS request

Criterion 2) existence or nonexistence of the transmission of the MBMS service Criterion 3) a threshold for a judgement period while the Physical Downlink Control Channel (PDCCH) used for the transmission of the MBMS service cannot be received Criterion 4) a threshold for a judgement period while the Physical Downlink Shared Channel (PDSCH) used for the transmission of the MBMS service cannot be received Criterion 5) a threshold for the downlink channel condition for the MBMS service feedback request Criterion 6) a threshold for a judgement period while the transmission type (the MCS value and the like) for the Physical Downlink Shared Channel (PDSCH) used for the transmission of the MBMS service is unsuitable If the above described Criterion 1) is used, the mobile station, which has not received "prohibition of the MBMS request" from the base station, judges that the MBMS request (the MBMS service transmission request, or the MBMS service feedback request) can be transmitted. On the other hand, the mobile station, which has received "prohibition of the MBMS request", does not transmit the MBMS request (the MBMS service feedback request) and/or the MBMS request (the MBMS service transmission request), even if any of the above described Conditions 1) to 4) is satisfied.

Moreover, in the above described Criterion 2), "existence or nonexistence of the transmission of the MBMS service" indicates "whether or not actual data transmission has been started while the provision of the MBMS service has been advertised". If the above described Criterion 2) is used, the mobile station receives "existence or nonexistence of the transmission of the MBMS service" from the base station, and only if the mobile station detects that the MBMS service is not being transmitted, the mobile station transmits the MBMS request (the MBMS service transmission request).

Moreover, if the above described Criterion 3) is used, "a threshold for a judgement period while the Physical Downlink Control Channel (PDCCH) used for the transmission of the MBMS service cannot be received" is received from the base station, and thereby, depending on a period in which the Physical Downlink Control Channel (PDCCH) used for the transmission of the MBMS service cannot be received, demodulated and/or decoded, the mobile station judges whether or not the MBMS request (the MBMS service feedback request) should be transmitted. In other words, only the mobile station which is larger than (or equal to or larger than) the threshold transmits the MBMS request (the MBMS service feedback request). It should be noted that this threshold may be a common value for all the cells which provide the MBMS service via the SCPTM transmission.

Moreover, if the above described Criterion 4) is used, "a threshold for a judgement period while the Physical Downlink Shared Channel (PDSCH) used for the transmission of the MBMS service cannot be received" is received from the base station, and thereby, depending on a period in which the Physical Downlink Shared Channel (PDSCH) used for the transmission of the MBMS service cannot be received, demodulated and/or decoded, the mobile station judges whether or not the MBMS request (the MBMS service feedback request) should be transmitted. In other words, only the mobile station which is larger than (or equal to or larger than) the threshold transmits the MBMS request (the MBMS service feedback request). It should be noted that this threshold may also be a common value for all the cells which provide the MBMS service via the SCPTM transmission.

Moreover, if the above described Criterion 5) is used, "a threshold for the downlink channel condition for the MBMS service feedback request" is received from the base station, and thereby, only the mobile station in which the downlink channel condition of the mobile station itself becomes equal to or less than (or less than) the threshold (corresponding to the threshold described in the above described Condition 3)) judges that the MBMS request (the MBMS service feedback request) is transmitted. It should be noted that this threshold may also be a common value for all the cells which provide the MBMS service via the SCPTM transmission.

Moreover, if the above described Criterion 6) is used, "a threshold for a judgement period while the transmission type (the MCS value and the like) for the Physical Downlink Shared Channel (PDSCH) used for the transmission of the MBMS service is unsuitable" is received from the base station, and thereby, depending on a period in which the transmission type (the MCS value and the like) for the Physical Downlink Shared Channel (PDSCH) used for the transmission of the MBMS service is unsuitable, the mobile station judges whether or not the MRMS request (the MBMS service feedback service feedback request) should be transmitted. In other words, only the mobile station which is larger than (or equal to or larger than) the threshold transmits the MBMS request (the MBMS service feedback request). It should be noted that this threshold may also be a common value for all the cells which provide the MBMS service via the SCPTM transmission.

It should be noted that the above described criteria (the MBMS request trigger criteria) are not limited thereto. Moreover, operations may be performed not only if a single criterion is satisfied, but also if a plurality of criteria are satisfied.

Here, the random access will be described. In the random access, there are two access methods including the Contention based Random Access and the Non-contention based Random Access. The former is the random access which can cause confliction between the mobile stations, and the latter is the random access which does not cause the confliction between the mobile stations. Since the former is used in the present embodiment, here, a procedure of the former will be described.

The contention based random access is started when the mobile station 20*a* transmits the preamble (the Message 1). The preamble includes a preamble ID which is a signal pattern representing information. Currently, it is assumed that six bits (that is, 64 kinds) are prepared as the preamble ID. Moreover, it is assumed that, in six bits of the information, a random ID is assigned to five bits, and information such as downlink path loss/CQI is assigned to a remaining one bit. As above, the mobile station 20*a* selects the preamble ID based on the random ID, the downlink path loss/CQI and the like, and transmits the preamble via the Random Access Channel (RACH) (FIG. 8—Procedure 3). It should be noted that this Message 1 also means a request for an uplink resource for transmitting a Message 3 (to be described later).

When the base station 10b receives the preamble from the mobile station 20a, the base station 10b places an RA-RNTI (Random Access-Radio Network Temporary Identity) indicating a response destined for the mobile station 20a which has transmitted the preamble via the Random Access Channel (RACH), in the Physical Downlink Control Channel (PDCCH), and also transmits a random access response (a Message 2) including synchronizing timing difference information, scheduling information on the Message 3 (to be described later), a Temporary C-RNTI (Temporary Cell-Radio Network Temporary Identity), the preamble ID of the received preamble, and the like, to the Physical Downlink Shared Channel (PDSCH) (FIG. 8—Procedure 4).

When the mobile station 20a confirms that there is the RA-RNTI in the Physical Downlink Control Channel (PDCCH), the mobile station 20a confirms contents of the random access response placed in the Physical Downlink Shared Channel (PDSCH), and detects whether or not the preamble ID of the preamble transmitted from the mobile station itself is included.

It should be noted that the mobile station 20a continues to wait for the random access response from the base station 10b for a certain period of time, and if the random access response including the preamble ID which has been transmitted is not received, the mobile station 20a departs from this procedure, and transmits the preamble again (FIG. 8—Procedure 3).

When the mobile station 20a detects the preamble ID transmitted from the mobile station itself, the mobile station 20a transmits the Message 3 in a scheduled radio resource (FIG. 8—Procedure 5). The Message 3 includes an RRC Connection Request (Radio Resource Control Connection Request), the MBMS request, and the channel quality information (the CQI feedback information).

The RRC Connection Request is information used when the mobile station in the idle mode transits to the connected mode, and includes an NAS ID (Non-Access-Stratum Identity) (for example, an IMSI (International Mobile Subscriber Identity) or a TMSI (Temporary Mobile Subscriber Identity)) of the mobile station, a selected PLMN ID (Public Land Mobile Network Identity) and the like, and is transmitted as the RRC message.

Along with this RRC Connection Request, the MBMS request is transmitted. In other words, the MBMS request is transmitted as L3 (Layer 3) level control information referred to as "RRC message", and includes the MBMS service feedback request message or the MBMS service transmission request message. Moreover, each message includes an MBMS service ID for identifying which MBMS service the request is made for. In this way, while the MBMS request may be included in the RRC Connection Request and transmitted, the MBMS request may be transmitted as another message. If the MBMS request is transmitted as another message, the MBMS request is included in an RRC signal from the mobile station after RRC Connection Setup.

Moreover, the MBMS request further includes the channel quality information. The channel quality information may be transmitted as L2 (Layer 2) level control information referred to as "MAC control Element", or may be included in the RRC message. Moreover, in this MBMS request, information indicating a detailed MBMS service reception status, which is different from the channel quality information, (for example, a status of satisfaction of the above described MBMS request transmission condition, and the like) may be transmitted. This facilitates the judgment of feedback resource assignment in the base station.

When the base station 10b receives the RRC Connection Request (the Message 3) from the mobile station 20a, the base station 10b transmits a Message 4 including the RRC Connection Setup (Radio Resource Control Connection Setup) to the mobile station 20a (FIG. 8—Procedure 7). This RRC Connection Setup includes the NAS ID detected in the Message 3 by the base station 10b, and thereby also functions as a contention resolution message with which the mobile station 20a judges whether or not the RRC Connection Setup is destined for the mobile station itself. If the mobile station 20a receives the RRC. Connection Setup including the NAS ID of the mobile station itself, RRC connection between the mobile station 20a and the base station 10b is established, and this contention based random access procedure is terminated.

If the MBMS request included in the Message 3 is the MBMS service transmission request, the base station 10b starts the transmission of the MBMS service, and based on the channel quality information (the CQI feedback information) obtained in the Message 3, judges whether or not the uplink feedback resource is assigned to the mobile station 20a (FIG. 8—Procedure 6). Moreover, if the MBMS request is the MBMS service feedback request, based on the channel quality information (the CQI feedback information) obtained in the Message 3, the base station 10b judges whether or not the uplink feedback resource is assigned to the mobile station 20a (FIG. 8—Procedure 6). Here, the MBMS request (the MBMS service transmission request or the MBMS service feedback request) is received from a plurality of the mobile stations, and the uplink feedback resource is assigned to the mobile station which has transmitted worst channel quality information (CQI feedback information). In other words, depending on a status (if the mobile station is not the mobile station which has transmitted the worst channel quality information), the base station 10b may not assign the uplink feedback resource in this RRC Connection Setup, or may also transmit RRC connection reject (a message for rejecting the RRC Connection Request received in the Message 3) instead of the RRC Connection Setup. According to this scheduling method, uplink feedback resource overhead can be reduced.

As above, in a case where the MBMS service has been received via the SCPTM transmission, if the uplink feedback resource has been assigned, the feedback resource assignment information is transmitted, along with the RRC Connection Setup, as the Message 4. The feedback resource assignment information includes resource assignment, a transmission cycle, a format of the feedback information (the channel quality information and/or the ACK/NACK feedback information) and the like for the Physical Uplink Control Channel (PUCCH) or the Physical Uplink Shared Channel (PUSCH).

It should be noted that the feedback resource assignment information may be included in the RRC Connection Setup, or may be transmitted as another message. If the feedback resource assignment information is transmitted as another message, the feedback resource assignment information is included in the RRC signal from the base station after the RRC Connection Setup.

Here, it is assumed that the base station 10b assigns the feedback resource to the mobile station 20a.

In the Message 4, the mobile station 20a, which has received the RRC Connection Setup including the NAS ID of the mobile station itself, subsequently (subsequent to FIG. 8—Procedure 8), uses the resource (the Physical Uplink Control Channel (PUCCH) or the Physical Uplink Shared Channel (PUSCH)) designated in the feedback resource assignment information, to transmit the channel quality information (the CQI feedback information) and/or the ACK/NACK.

In this way, generally, since the uplink resource is limited, in a case where the number of mobile stations which transmit the uplink feedback information has reached a certain number, if a mobile station which sends back worse channel quality information (CQI feedback information) appears, the base station assigns the uplink feedback resource to the mobile station, and also performs the scheduling so that the uplink feedback resource(s) of the other mobile station(s) are released. It should be noted that, in a case where the number of mobile stations which transmit the uplink feedback information has not reached the certain number, if the mobile station which sends back the worse channel quality information (CQI feedback information) appears, the base station does not necessarily need to release (however, may release) the uplink feedback resource(s) of the other mobile station(s) even if the base station assigns the uplink feedback resource to the mobile station.

Moreover, if a mobile station which sends back better channel quality information (CQI feedback information) appears, the base station may perform the scheduling so that the assignment of the uplink feedback resource for the mobile station is released.

Next, FIG. 9 will be described with reference to FIG. 8. The mobile station periodically performs a Cell Reselection process in the idle mode (RRC_IDLE) (FIG. 9—Step S1).

Subsequently, the Physical Downlink Synchronization Channel (PSCH) and the Physical Broadcast Channel (PBCH) from the base station 10b are received, demodulated and/or decoded, and the MBMS-related information broadcasted via the Physical Downlink Shared Channel (PDSCH) or the like is obtained. The MBMS-related information includes the advertising information indicating that the base station 10b is providing the MBMS service via the SCPTM transmission, the above described MBMS request trigger criterion, and the like (FIG. 9—Step S2). It should be noted that the mobile station 20a which receives the MBMS can receive the MBMS service even in the idle mode, and thus, also receives broadcast information for the connected mode. Thereby, both the mobile stations in the idle mode and in the connected mode can receive the MBMS-related information and the Measurement Configuration information (to be described later).

In the MBMS service desired to be received, if a condition for performing the MBMS request (the MBMS request transmission condition based on the trigger criterion) is satisfied (if YES in FIG. 9—Step S3), the mobile station 20a enters an MBMS request transmission process. On the other hand, if the condition is not satisfied (if NO in FIG. 9—Step S3), the mobile station 20a returns to FIG. 9—Step S1.

FIG. 9—Step S4 is a process corresponding to FIG. 8—Procedures 3 to 5. In other words, the mobile station 20a transmits the preamble to the base station 10b, receives the random access response including the scheduling information for transmitting the Message 3 and the like from the base station 10b, and transmits the Message 3 including the RRC Connection Request (including the NAS ID of the mobile station itself), the MBMS request and the channel quality information (the CQI feedback information) to the base station 10b.

Next, if the Message 4, which includes the RRC Connection Setup including the NAS ID which is destined for the mobile station itself, and which includes the uplink feedback resource assignment information, is received from the base station 10b (if YES in FIG. 9—Step S5), the mobile station 20a transits to the connected mode (RRC_CONNECTED), and also uses the designated uplink feedback resource to transmit the feedback information (the CQI feedback information and/or the ACK/NACK feedback information) to the base station (FIG. 9—Step S6). Otherwise (if NO in FIG. 9—Step S5), the mobile station 20a remains in the idle mode without transiting to the connected mode, and returns to FIG. 9—Step S1. Moreover, also if the RRC connection reject has been received from the base station 10b (if NO in FIG. 9—Step S5), the mobile station 20a remains in the idle mode without transiting to the connected mode, and returns to FIG. 9—Step S1.

In this way, generally, since the uplink resource is limited, in the case where the number of mobile stations which transmit the uplink feedback information has reached the certain number, if a mobile station which sends back worse channel condition and MBMS reception status appears, the base station assigns the uplink feedback resource to the mobile station, and also performs the scheduling so that the uplink feedback resource(s) of the other mobile station(s) are released. It should be noted that, in a case where the number of mobile stations which transmit the uplink feedback information has not reached the certain number, if the mobile station which sends back the worse channel condition and MBMS reception status appears, the base station does not necessarily need to release (however, may release) the uplink feedback resource(s) of the other mobile station(s) even if the base station assigns the uplink feedback resource to the mobile station.

Moreover, if a mobile station which sends back better channel condition and MBMS reception status appears, the base station may perform the scheduling so that the assignment of the uplink feedback resource for the mobile station is released.

According to the communication technique according to the present embodiment, if the condition for performing the MBMS request is satisfied, the mobile station transmits the MBMS request to the base station. Thereby, the base station can efficiently provide the MBMS service to the mobile station via the SCPTM transmission.

<Further Variation>

In the above described first embodiment, a case where the mobile station in the idle mode performs the Cell Reselection to the cell which provides the MBMS service via the SCPTM transmission has been described by way of example. However, for example, also if the uplink feedback resource is not originally assigned in the cell and the downlink channel condition (or quality) or the MBMS reception status of the mobile station in the idle mode which is receiving the MBMS service is degraded, the sequence diagram and the flowchart described in FIGS. 8 and 9 are applicable.

Second Embodiment

Figure 11:
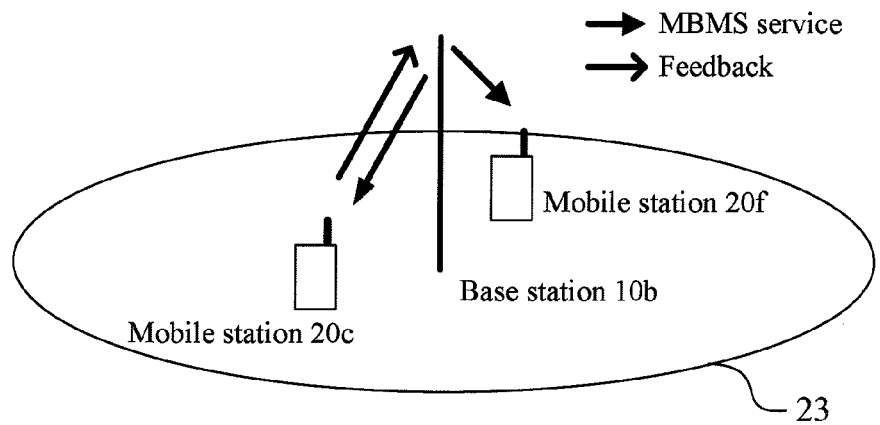
FIG. 11 is a diagram showing the mobile station in the connected mode, which is receiving the MBMS service from the base station and transmitting uplink feedback information, and the mobile station in the connected mode, which is receiving the MBMS service from the base station but is not transmitting the uplink feedback information, while another mobile station is receiving the MBMS service.

Next, the communication technique according to the second embodiment of the present invention will be described with reference to the drawings. FIG. 11 is a diagram for explaining a mechanism of the communication technique according to the second embodiment of the present invention. In FIG. 11, a cell 23 in which the base station 10b provides the MBMS service via the SCPTM transmission, and mobile stations 20c and 20f are described. Here, the mobile station 20c represents the mobile station in the connected mode, which is receiving the MBMS service from the base station 10b and transmitting the uplink feedback information, and the mobile station 20f represents the mobile station in the connected mode, which is receiving the MBMS service but is not transmitting the uplink feedback information to the base station 10b. Moreover, as a configuration of the base station 10b and configurations of the mobile stations 20c and 20f, the configurations described in the first embodiment are used. Moreover, FIG. 12 is a sequence diagram showing a procedure in which, in the cell 23 in which the base station 10b provides the MBMS service via the SCPTM transmission, the mobile stations 20c and 20f, which are receiving the MBMS service but are in the connected mode for the base station 10b, transmit the MBMS Measurement Report to the base station 10b.

Hereinafter, a flow when the mobile station in the connected mode transmits the uplink feedback information will be described with reference to the sequence diagram of FIG. 12. Hereinafter, the description is provided also with reference to FIG. 11, as appropriate.

Figure 12:
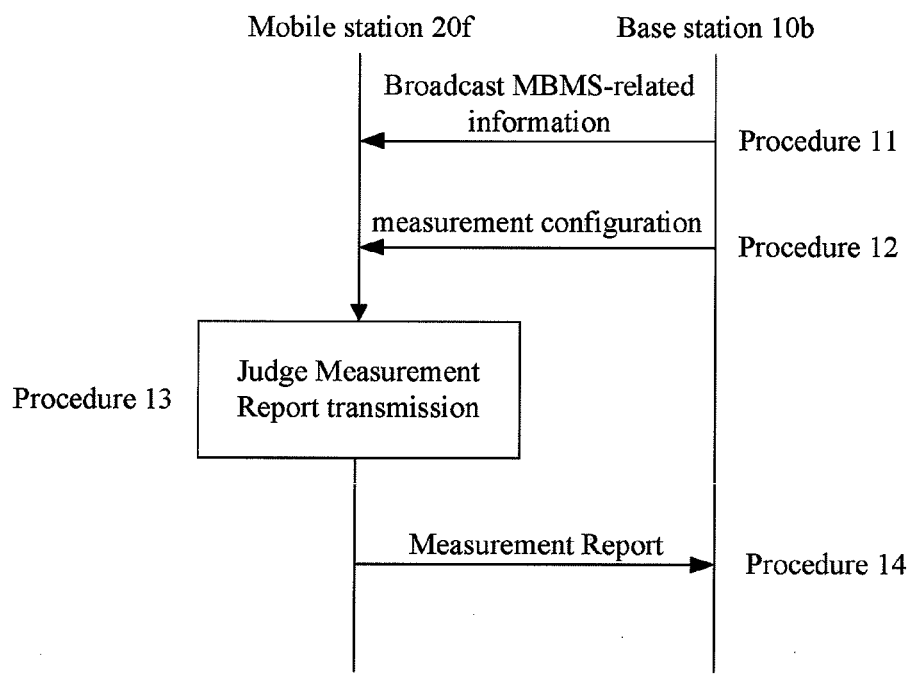
FIG. 12 is the communication technique according to a second embodiment of the present invention, and is a sequence diagram showing a procedure in which, in a cell in which the base station provides the MBMS service via the SCPTM transmission, mobile stations 20*c* and 20*f*, which are receiving the MBMS service but are in the connected mode for the base station 10*b*, transmit an MBMS Measurement Report to the base station 10*b*.

As shown in FIG. 12, the mobile stations 20c and 20f, which are already receiving the MBMS service but are in the connected mode for the base station 10b, receive, demodulate and/or decode the Physical Downlink Synchronization Channel (PSCH) and the Physical Broadcast Channel (PBCH) for the base station 10b. Moreover, the mobile stations 20c and 20f also already know that the provision of the MBMS service via the SCPTM transmission is being performed in the base station 10b.

This knowledge is obtained from the MBMS-related information broadcasted by the base station 10b (Procedure 11 of FIG. 12). The MBMS-related information is included in the BCCH or the MCCH, which is the logical channel, and is mapped to the Physical Downlink Shared Channel (PDSCH). It should be noted that the MBMS-related information includes the advertising information indicating that the provision of the MBMS service via the SCPTM transmission is being performed in the base station 10b, and in addition, an MBMS Measurement Report trigger criterion to be described later, and the like.

Next, the mobile stations 20c and 20f receive the Measurement Configuration information from the base station 10b, periodically or in a triggered manner (Procedure 12 of FIG. 12). The Measurement Configuration information includes a Measurement Report criterion to be described later (Periodic Reporting, Event Triggered Reporting, Event Triggered Periodic Reporting, or the like), a measurement item (Reference Signal Received Power (RSRP), a Carrier Received Signal Strength Indicator (RSSI), Reference Signal Received Quality (RSRQ) or the like), a threshold of the measurement item, a measurement ID (Measurement Identity), a Measurement Command, a Measurement Reporting format, and the like.

The Measurement Report criterion is information which defines a timing at which a measurement result performed by the mobile station is transmitted to the base station.

The measurement item represents which signal in the signals transmitted from the base station is a measurement target.

Moreover, the measurement ID is used to designate whether the measurement target is a signal from a base station having the same carrier frequency in an EUTRAN (EUTRA Network), a signal from a base station having a different carrier frequency in the EUTRA, or a signal from a base station in a network other than the EUTRAN (that is, a UTRAN (Universal Terrestrial Radio Access Network) and a GERAN).

Moreover, the Measurement Command is used when the base station notifies the mobile station of a measurement start/stop instruction or an update of the Measurement Configuration information. In other words, start and stop of the measurement in the mobile station is designated by the base station.

The above described Measurement Configuration information is transmitted as the RRC message (mobile station specific information or cell specific information). In the case of the mobile station specific information, the Measurement Configuration information is transmitted as the RRC signal, and in the case of the cell specific information, the Measurement Configuration information is transmitted as a broadcast signal.

In the present embodiment, an MBMS Measurement Report criterion is added to the Measurement Report criterion at a time of the Event Triggered Reporting which is usually used for handover or the like.

There are two kinds of MBMS Measurement Reports. One of the MBMS Measurement Reports is "MBMS service transmission request report" which is transmitted if the transmission of the MBMS service desired to be received is not being performed. The other one of the MBMS Measurement Reports is "MBMS service feedback request report" which is triggered if the transmission type (the MCS value and the like) for the MBMS service which is being transmitted is changed, or the uplink feedback resource is requested.

The mobile stations 20c and 20f judge whether or not the MBMS Measurement Report is actually transmitted in this cell (FIG. 12—Procedure 13). This judgment is performed by the radio resource control unit 209.

In other words, if the transmission of the MBMS service desired to be received is not being performed, the mobile stations 20c and 20f transmit the MBMS Measurement Report (an MBMS service transmission request report message) (Procedure 14 of FIG. 12). Moreover, if, while the transmission of the MBMS service desired to be received is being performed, the following condition (an MBMS Measurement Report condition) is satisfied, the MBMS Measurement Report (an MBMS service feedback request report message) is transmitted (Procedure 14 of FIG. 12). As the MEMS Measurement Report condition, conditions similar to the MBMS request transmission conditions described in the first embodiment can be used. The conditions are shown as follows.

Condition 1) the case where the Physical Downlink Control Channel (PDCCH) to be used when the MBMS service is transmitted cannot be received, demodulated and/or decoded for the certain period of time. In other words, the case where the MBMS-RNTI which is a group identifier to be used when the MBMS service is transmitted cannot be detected for the certain period of time.

Condition 2) the case where, while the Physical Downlink Control Channel (PDCCH) has been able to be received, demodulated and/or decoded, the Physical Downlink Shared Channel (PDSCH) has not been able to be received, demodulated and/or decoded for the certain period of time. In other words, the case where the Cyclic Redundancy Check (CRC) added to the Physical Downlink Shared Channel (PDSCH) has not succeeded for the certain period of time.

Condition 3) the case where the downlink channel condition (or quality) of the mobile station itself is equal to or less than (or less than) the threshold broadcasted by the base station 10b.

Condition 4) the case where, while the Physical Downlink Control Channel (PDCCH) has been able to be received, demodulated and/or decoded, the transmission type (the MCS value and the like) for demodulating and/or decoding the Physical Downlink Shared Channel (PDSCH), which is designated in the Physical Downlink Control Channel (PDCCH), does not meet the downlink channel condition (or quality) of the mobile station itself. In other words, the case where the MCS value is too high for the downlink channel condition (or quality) of the mobile station itself (the MCS value corresponding to the channel condition is better than the downlink channel condition of the mobile station itself), and thus the Physical Downlink Shared Channel (PDSCH) including the MBMS service cannot be received, demodulated and/or decoded.

It should be noted that the above described conditions are not limited thereto. Moreover, the operations may be performed not only if a single condition is satisfied, but also if the plurality of condition are satisfied. Condition 1, Condition 2 and Condition 4 are the thresholds related to the MBMS reception status, and Condition 3 is the threshold related to the channel condition.

As above, the mobile station, which has detected that any condition of the above described Conditions 1) to 4) has been satisfied, transmits the MBMS Measurement Report (the MBMS service feedback request report message) in the uplink. Moreover, the mobile station, which has detected that the transmission of the MBMS service desired to be received is not being performed, also similarly, immediately transmits the MBMS Measurement Report (the MBMS service transmission request report message).

Furthermore, since the base station 10*b* broadcasts information (the MBMS Measurement Report trigger criterion: MBMS Trigger Criteria) for controlling a frequency of occurrence of the MBMS Measurement Report, as described below, the mobile station can control the frequency of occurrence of the MBMS request.

Criterion 1) prohibition of the MBMS Measurement Report

Criterion 2) existence or nonexistence of the transmission of the MBMS service Criterion 3) a threshold for a judgement period while the Physical Downlink Control Channel (PDCCH) used for the transmission of the MBMS service cannot be received Criterion 4) a threshold for a judgement period while the Physical Downlink Shared Channel (PDSCH) used for the transmission of the MBMS service cannot be received Criterion 5) a threshold for the downlink channel condition for the MBMS service feedback request report Criterion 6) a threshold for a judgement period while the transmission type (the MCS value and the like) for the Physical Downlink Shared Channel (PDSCH) used for the transmission of the MBMS service is unsuitable If the above described Criterion 1) is used, the mobile station, which has not received "prohibition of the MBMS Measurement Report" from the base station, judges that the MBMS Measurement Report (the MBMS service transmission request report, or the MBMS service feedback request report) can be transmitted. On the other hand, the mobile station, which has received "prohibition of the MBMS Measurement Report", does not transmit the MBMS Measurement Report (the MBMS service feedback request report) and/or the MBMS Measurement Report (the MBMS service transmission request report), even if any of the above described Conditions 1) to 4) is satisfied.

Moreover, in the above described Criterion 2), "existence or nonexistence of the transmission of the MBMS service" indicates "whether or not actual data transmission has been started while the provision of the MBMS service has been advertised". If the above described Criterion 2) is used, the mobile station receives "existence or nonexistence of the transmission of the MBMS service" from the base station, and only if the mobile station detects that the MBMS service is not being transmitted, the mobile station transmits the MBMS Measurement Report (the MBMS service transmission request report).

Moreover, if the above described Criterion 3) is used, "a threshold for a judgement period while the Physical Downlink Control Channel (PDCCH) used for the transmission of the MBMS service cannot be received" is received from the base station, and thereby, depending on the period in which the Physical Downlink Control Channel (PDCCH) used for the transmission of the MBMS service cannot be received, demodulated and/or decoded, the mobile station judges whether or not the MBMS Measurement Report (the MBMS service feedback request report) should be transmitted. In other words, only the mobile station which is larger than (or equal to or larger than) the threshold transmits the MBMS Measurement Report (the MBMS service feedback request report). It should be noted that this threshold may be the common value for all the cells which provide the MBMS service via the SCPTM transmission.

Moreover, if the above described Criterion 4) is used, "a threshold for a judgement period while the Physical Downlink Shared Channel (PDSCH) used for the transmission of the MBMS service cannot be received" is received from the base station, and thereby, depending on the period in which the Physical Downlink Shared Channel (PDSCH) used for the transmission of the MBMS service cannot be received, demodulated and/or decoded, the mobile station judges whether or not the MBMS Measurement Report (the MBMS service feedback request report) should be transmitted. In other words, only the mobile station which is larger than (or equal to or larger than) the threshold transmits the MBMS Measurement Report (the MBMS service feedback request report). It should be noted that this threshold may also be the common value for all the cells which provide the MBMS service via the SCPTM transmission.

Moreover, if the above described Criterion 5) is used, "a threshold for the downlink channel condition for the MBMS service feedback request report" is received from the base station, and thereby, only the mobile station in which the downlink channel condition of the mobile station itself becomes equal to or less than (or less than) the threshold (corresponding to the threshold described in the above described Condition 3)) judges that the MBMS Measurement Report (the MBMS service feedback request report) is transmitted. It should be noted that this threshold may also be the common value for all the cells which provide the MBMS service via the SCPTM transmission.

Moreover, if the above described Criterion 6) is used, "a threshold for a judgement period while the transmission type (the MCS value and the like) for the Physical Downlink Shared Channel (PDSCH) used for the transmission of the MBMS service is unsuitable" is received from the base station, and thereby, depending on the period in which the transmission type (the MCS value and the like) for the Physical Downlink Shared Channel (PDSCH) used for the transmission of the MBMS service is unsuitable, the mobile station judges whether or not the MBMS Measurement Report (the MBMS service feedback request report) should be transmitted. In other words, only the mobile station which is larger than (or equal to or larger than) the threshold transmits the MBMS Measurement Report (the MBMS service feedback request report). It should be noted that this threshold may also be the common value for all the cells which provide the MBMS service via the SCPTM transmission.

As above, the base station 10*b* can change the transmission type for the MBMS service based on the MBMS Measurement Report from the mobile station 20*f*.

It should be noted that the above described criteria (the MBMS Measurement Report trigger criteria) are not limited thereto. Moreover, the operations may be performed not only if a single criterion is satisfied, but also if a plurality of criteria are satisfied.

Furthermore, separately from the above described conditions and criteria (lower thresholds), reverse thresholds, that is, upper thresholds, can be provided for the mobile station 20c which is providing the feedback. In other words, the mobile station 20c in the channel condition and the MBMS reception status which are equal to or larger than an upper threshold transmits the MBMS Measurement Report so that the base station 10b can release the feedback resource.

Figure 13:
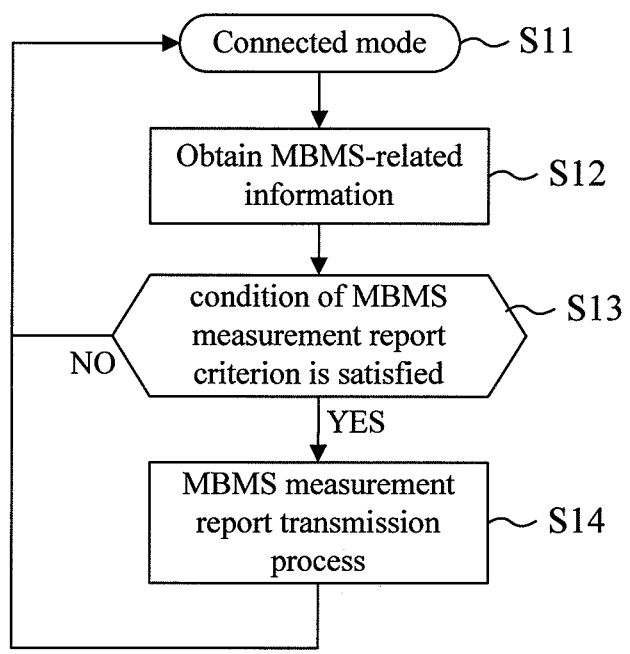
FIG. 13 is a flowchart diagram showing a processing procedure in which the mobile station in the connected mode provides the MBMS Measurement Report, through the procedure of FIG. 12.

Next, FIG. 13 will be described with reference to FIG. 12. Here, while the mobile station 20f will be described, the mobile station 20c also performs a similar process. The mobile station 20f in the connected mode (RRC_CONNECTED) (FIG. 13—Step S11) receives, demodulates and/or decodes the Physical Downlink Synchronization Channel (PSCH) and the Physical Broadcast Channel (PBCH) from the base station 10b, and obtains the MBMS-related information broadcasted via the Physical Downlink Shared Channel (PDSCH) or the like (FIG. 13—Step S12). The MBMS-related information includes the advertising information indicating that the base station 10b is providing the MBMS service via the SCPTM transmission, the above described MBMS Measurement Report trigger criterion, and the like. Then, the base station 10b designates the mobile station 20f to start the measurement. The mobile station 20f which is designated to start the measurement starts the measurement according to the MBMS Measurement Report criterion from the base station 10b (FIG. 13—Step S13).

In the MBMS service desired to be received, if a condition for performing the MBMS Measurement Report (the MBMS Measurement Report condition based on the trigger criterion) is satisfied (if YES in FIG. 13—Step S13), the mobile station 20f enters an MBMS Measurement Report transmission process (FIG. 13—Step S14). On the other hand, if the condition is not satisfied (if NO in FIG. 13—Step S13), the mobile station 20f returns to FIG. 13—Step S11.

This MBMS Measurement Report includes information indicating that the MBMS Measurement Report criterion has been achieved, or a measured value itself. This Measurement Report is transmitted as the L3 (Layer 3) level control information referred to as "RRC message", and includes the MBMS service feedback request report message or an MBMS service transmission report message. Moreover, each message includes the MBMS service ID for identifying which MBMS service the request is made for.

In this way, generally, since the uplink resource is limited, in the case where the number of mobile stations which transmit the uplink feedback information has reached a certain number, if the mobile station which sends back the worse channel condition and/or MBMS reception status appears, the base station assigns the uplink feedback resource to the mobile station, and also performs the scheduling so that the uplink feedback resource(s) of the other mobile station(s) are released. It should be noted that, in the case where the number of mobile stations which transmit the uplink feedback information has not reached the certain number, if the mobile station which sends back the worse channel condition and/or MBMS reception status appears, the base station does not necessarily need to release (however, may release) the uplink feedback resource(s) of the other mobile station(s) even if the base station assigns the uplink feedback resource to the mobile station.

Moreover, if the mobile station which sends back the better channel condition and/or MBMS reception status appears, the base station may perform the scheduling so that the assignment of the uplink feedback resource for the mobile station is released.

Furthermore, the base station 10b can change the transmission type for the MBMS service based on the MBMS Measurement Report from the mobile station 20f.

As described above, according to the communication technique according to the present embodiment, if the condition for performing the MBMS Measurement Report is satisfied, the mobile station transmits the MBMS Measurement Report to the base station. Thereby, there is an advantage that the base station can efficiently provide the MBMS service to the mobile station via the SCPTM transmission.

Moreover, if the same conditions are used for the MBMS request transmission conditions described in the first embodiment and the MBMS Measurement Report conditions described in the second embodiment, and furthermore, if the same criteria are used for the MBMS request trigger criteria described in the first embodiment and the MBMS Measurement Report trigger criteria described in the second embodiment, complexity of the measurement in the mobile station can be reduced. Moreover, the MBMS Measurement Report, an MBMS service request report and the MBMS service feedback request report used in the second embodiment may be configured to use the same messages as those of an MBMS measurement request, an MBMS service request and the MBMS service feedback request used in the first embodiment, respectively. Thereby, design complexity of the mobile station can be reduced.

<Further Variation>

It should be noted that the present invention is not limited to the examples shown in the above described embodiments, and various changes can be made. In each of the above described embodiments, configurations and the like shown in the accompanying drawings are not limited thereto, and can be changed as appropriate within a range for exhibiting the effects of the present invention. In addition, the present invention can be changed and practiced as appropriate, as long as the change does not deviate from scope of the object of the present invention.

Moreover, processes in the respective units may be performed by recording a program for realizing functions described in the present embodiment, in a computer-readable recording medium, causing a computer system to read the program recorded in this recording medium, and executing the program. It should be noted that "computer system" as herein referred to is assumed to include an OS and hardware such as peripheral devices.

Moreover, "computer system" is assumed to also include a homepage provision environment (or display environment) if a WWW system is used.

Moreover, "computer-readable recording medium" refers to a portable medium such as a flexible disk, a magnetic optical disk, a ROM or a CD-ROM, or a storage device such as a hard disk included in the computer system. Furthermore, "computer-readable recording medium" is assumed to also include a medium which dynamically retains the program for a short time, such as communication wires in a case where the program is transmitted via a network such as the Internet or communication lines such as telephone lines, and a medium which retains the program for a certain period of time, such as a volatile memory within the computer system which becomes a server or a client in that case. Moreover, the above described program may be for realizing a part of the above described functions, and furthermore, may be able to realize the above described functions in combination with a program which has already been recorded in the computer system. Moreover, the above described program may be a communication method.

Moreover, in the above description, for convenience, a case where the base station apparatus and the mobile station apparatus perform processes in a one-to-one manner has been described. However, of course, a plurality of the base stations may exist, or a plurality of the mobile stations may exist.

Moreover, kinds of radio access means are not limited to existing means such as W-CDMA, cdma2000, wireless LAN and PHS, and the present invention is also applicable to communication means which is practically used in the future.

INDUSTRIAL APPLICABILITY

The present invention can be used in a mobile communication system which provides the MBMS service.

The invention claimed is:

1. A mobile station apparatus comprising:
a radio unit configured to:
transmit a Multimedia Broadcast Multicast Service (MBMS) service feedback request to a base station apparatus by performing contention based random access via Random Access Channel (RACH) in case that a condition for transmitting the MBMS service feedback request is satisfied,
use a feedback resource, which is assigned by the base station apparatus based on the MBMS service feedback request, to transmit feedback information to the base station apparatus, and wherein
the condition is a case where a Physical Downlink Control Channel (PDCCH) is allocated in a same subframe as a Physical Downlink Shared Channel (PDSCH) to be used for transmitting a MBMS service, the PDCCH cannot be decoded for a certain period of time, and a downlink channel condition or quality of the mobile station apparatus itself is equal to or less than a threshold broadcasted by the base station apparatus.

2. A communication method applied to a communication system including a mobile station apparatus and a base station apparatus which provides the mobile station apparatus with a Multimedia Broadcast Multicast Service (MBMS) service,
the mobile station apparatus transmits a MBMS service feedback request to the base station apparatus by performing contention based random access via Random Access Channel (RACH) in case that a condition for transmitting the MBMS service feedback request is satisfied;
the base station apparatus assigns a feedback resource to the mobile station apparatus, based on the MBMS service feedback request received from the mobile station apparatus;
the mobile station apparatus uses the feedback resource to transmit feedback information to the base station apparatus;
the base station apparatus changes a transmission type for the MBMS service, based on the feedback information received from the mobile station apparatus; and wherein
the condition is a case where a Physical Downlink Control Channel (PDCCH) is allocated in a same subframe as a Physical Downlink Shared Channel (PDSCH) to be used for transmitting the MBMS service, the PDCCH cannot be decoded for a certain period of time, and a downlink channel condition or quality of the mobile station apparatus itself is equal to or less than a threshold broadcasted by the base station apparatus.

3. A base station apparatus comprising:
a radio unit configured to:
assign a feedback resource to a mobile station apparatus, based on a Multimedia Broadcast Multicast Service (MBMS) service feedback request which is transmitted by the mobile station apparatus, to the base station apparatus by performing contention based random access via Random Access Channel (RACH), in case that the mobile station apparatus considers a condition for transmitting the MBMS service feedback request is satisfied and which is received by the base station apparatus,
change a transmission type for a MBMS service, based on a feedback information received from the mobile station apparatus via the feedback resource, and wherein
the condition is a case where a Physical Downlink Control Channel (PDCCH) is allocated in a same subframe as a Physical Downlink Shared Channel (PDSCH) to be used for transmitting the MBMS service, the PDCCH cannot be decoded by the mobile station apparatus for a certain period of time, and a downlink channel condition or quality of the mobile station apparatus itself is equal to or less than a threshold broadcasted by the base station apparatus.

* * * * *